(12) United States Patent
Hwang et al.

(10) Patent No.: US 11,977,699 B2
(45) Date of Patent: May 7, 2024

(54) ELECTRONIC DEVICE AND OPERATING METHOD OF THE SAME

(71) Applicant: SAMSUNG ELECTRONICS CO., LTD., Suwon-si (KR)

(72) Inventors: Jinyoung Hwang, Suwon-si (KR); Dongchan Kim, Suwon-si (KR); Dongnam Byun, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/694,155

(22) Filed: Mar. 14, 2022

(65) Prior Publication Data

US 2022/0334670 A1     Oct. 20, 2022

Related U.S. Application Data

(63) Continuation of application No. PCT/KR2022/001706, filed on Feb. 3, 2022.

(30) Foreign Application Priority Data

Apr. 19, 2021 (KR) .................. 10-2021-0050732
Jun. 15, 2021 (KR) .................. 10-2021-0077426

(51) Int. Cl.
*G06F 3/041* (2006.01)

(52) U.S. Cl.
CPC .................. *G06F 3/0416* (2013.01)

(58) Field of Classification Search
CPC .................. G06F 3/0416; G06F 3/04883
See application file for complete search history.

(56) References Cited

U.S. PATENT DOCUMENTS 7,698,235 B2    4/2010   Kuroiwa
7,835,999 B2   11/2010   Block
(Continued)

FOREIGN PATENT DOCUMENTS

CN    110554793 A    12/2019
CN    111061394 A     4/2020
(Continued)

OTHER PUBLICATIONS

International Search Report and Written Opinion dated May 4, 2022 issued by the International Searching Authority in International Application No. PCT/KR2022/001706 (PCT/ISA/220, PCT/ISA/210, and PCT/ISA/237).
(Continued)

*Primary Examiner* — Ryan A Lubit
(74) *Attorney, Agent, or Firm* — Sughrue Mion, PLLC

(57) ABSTRACT

Provided is a method of identifying a touch type of a user touch input with respect to an electronic device, the method including: obtaining touch data from a touch input received from a user; determining a touch recognition model set consisting of touch recognition models to be used to identify a touch type of the touch input of the user from among a plurality of touch recognition models corresponding to a plurality of partial time periods included in a time in which the touch input is maintained; obtaining touch type probability values with respect to the touch input of the user by applying the touch data to the touch recognition models included in the touch recognition model set; and identifying a touch type of the touch input, based on the obtained touch type probability values.

20 Claims, 26 Drawing Sheets

(56) References Cited

U.S. PATENT DOCUMENTS

| | | | |
|---|---|---|---|
| 8,432,368 | B2 | 4/2013 | Momeyer et al. |
| 8,473,448 | B2 | 6/2013 | Yuta |
| 8,723,824 | B2 | 5/2014 | Myers et al. |
| 8,948,500 | B2 | 2/2015 | Chen et al. |
| 9,104,308 | B2 | 8/2015 | Au et al. |
| 9,323,360 | B2 | 4/2016 | Lee |
| 9,454,301 | B2 | 9/2016 | Ka et al. |
| 9,733,745 | B1* | 8/2017 | Kremin .......... G06F 3/0446 |
| 9,823,781 | B2 | 11/2017 | Ludwig et al. |
| 10,013,094 | B1 | 7/2018 | Smith |
| 10,073,559 | B2 | 9/2018 | Kim et al. |
| 10,241,621 | B2 | 3/2019 | Kang |
| 10,261,685 | B2 | 4/2019 | Deselaers et al. |
| 10,296,210 | B2 | 5/2019 | Jin et al. |
| 10,379,657 | B2 | 8/2019 | Filiz et al. |
| 10,459,561 | B2 | 10/2019 | Bosch Ruiz et al. |
| 10,496,705 | B1* | 12/2019 | Irani .......... H04L 51/18 |
| 10,558,792 | B2 | 2/2020 | Jiang et al. |
| 10,777,193 | B2 | 9/2020 | Lee et al. |
| 10,782,821 | B2 | 9/2020 | Bjerre |
| 10,795,481 | B2 | 10/2020 | Tsai et al. |
| 10,949,022 | B2 | 3/2021 | Lee |
| 11,099,679 | B2 | 8/2021 | Ledet et al. |
| 2011/0199323 | A1 | 8/2011 | Lin et al. |
| 2012/0019456 | A1 | 1/2012 | Choi et al. |
| 2012/0056846 | A1 | 3/2012 | Zaliva |
| 2015/0161231 | A1 | 6/2015 | Yu et al. |
| 2016/0204001 | A1 | 7/2016 | Lee et al. |
| 2017/0200274 | A1 | 7/2017 | Tan et al. |
| 2017/0293396 | A1 | 10/2017 | Jung et al. |
| 2017/0357425 | A1* | 12/2017 | Smith .......... H04L 12/2816 |
| 2018/0107332 | A1 | 4/2018 | Chan et al. |
| 2018/0188938 | A1* | 7/2018 | Deselaers .......... G06F 3/04883 |
| 2018/0276630 | A1 | 9/2018 | Kim et al. |
| 2019/0204929 | A1 | 7/2019 | Attari et al. |
| 2019/0318261 | A1 | 10/2019 | Deng et al. |
| 2019/0354238 | A1 | 11/2019 | Akhbari et al. |
| 2020/0012382 | A1 | 1/2020 | Lee |
| 2020/0057525 | A1 | 2/2020 | Prest et al. |
| 2020/0097845 | A1 | 3/2020 | Shaikh et al. |
| 2020/0110774 | A1 | 4/2020 | Lakshmanan et al. |
| 2020/0167693 | A1 | 5/2020 | Jiang et al. |
| 2020/0202171 | A1 | 6/2020 | Hughes et al. |
| 2020/0310621 | A1 | 10/2020 | Piot et al. |
| 2020/0349246 | A1 | 11/2020 | Budman et al. |
| 2020/0394451 | A1 | 12/2020 | Baijal et al. |
| 2021/0327421 | A1 | 10/2021 | Beaufays et al. |
| 2022/0043984 | A1* | 2/2022 | Miranda .......... G06N 3/084 |
| 2022/0108788 | A1* | 4/2022 | Shelton, IV .......... A61B 34/20 |
| 2022/0375201 | A1 | 11/2022 | Wiles |

FOREIGN PATENT DOCUMENTS

| | | |
|---|---|---|
| EP | 4 174 629 A1 | 5/2023 |
| JP | 5083320 B2 | 11/2012 |
| JP | 2015-69225 A | 4/2015 |
| KR | 10-1189078 B1 | 10/2012 |
| KR | 10-1202414 B1 | 11/2012 |
| KR | 10-1350782 B1 | 1/2014 |
| KR | 10-1577277 B1 | 12/2015 |
| KR | 10-2016-0000388 A | 1/2016 |
| KR | 10-1653167 B1 | 9/2016 |
| KR | 10-2017-0030246 A | 3/2017 |
| KR | 10-2017-0081401 A | 7/2017 |
| KR | 10-2017-0111773 A | 10/2017 |
| KR | 10-2018-0017500 A | 2/2018 |
| KR | 10-2018-0106744 A | 10/2018 |
| KR | 10-2019-0001434 A | 1/2019 |
| KR | 10-2019-0104101 A | 9/2019 |
| KR | 10-2019-0105767 A | 9/2019 |
| KR | 10-2019-0109805 A | 9/2019 |
| KR | 10-2020-0014510 A | 2/2020 |
| KR | 10-2020-0142374 A | 12/2020 |
| KR | 10-2022-0023639 A | 3/2022 |
| KR | 10-2022-0105941 A | 7/2022 |
| WO | 2016/007450 A1 | 1/2016 |
| WO | 2017/007573 A1 | 1/2017 |
| WO | 2017/114062 A1 | 7/2017 |
| WO | 2018/125347 A1 | 7/2018 |
| WO | 2019/159012 A1 | 8/2019 |

OTHER PUBLICATIONS

Tobias Boceck et al., "Force Touch Detection on Capacitive Sensors using Deep Neural Networks", 21st International Conference on Human-Computer Interaction with Mobile Devices and Services (MobileHCI '19), Oct. 2019, 6 pages total.

"HUAWEI Mate 30 Pro", HUAWEI Global, Huawei Device Co., Ltd., 1998, 19 pages total, https://consumer.huawei.com/en/phones/mate30-pro/.

Andrew Howard et al., "Searching for MobileNetV3", arXiv:1905.02244v5 [cs.CV], Nov. 2019, 11 pages total.

Sergey Ioffe et al., "Batch Normalization: Accelerating Deep Network Training by Reducing Internal Covariate Shift", arXiv:1502.03167v3 [cs.LG], Mar. 2015, 11 pages total.

Sanghyun Woo et al., "CBAM: Convolutional Block Attention Module", arXiv:1807.06521v2 [cs.CV], Jul. 2018, 17 pages total.

David E. Rumelhart et al., "Learning representations by back-propagating errors", Nature, vol. 323, Oct. 1986, 4 pages total.

International Search Report and Written Opinion dated Sep. 24, 2021 issued by the International Searching Authority in International Application No. PCT/KR2021/007825 (PCT/ISA/220, PCT/ISA/210, and PCT/ISA/237).

Communication dated Jun. 2, 2023 by the European Patent Office in European Patent Application No. 22704489.8.

International Search Report and Written Opinion dated Feb. 23, 2022 by the International Searching Authority in International Application No. PCT/KR2021/017280. (PCT/ISA/220, PCT/ISA/210 and PCT/ISA/237).

Liu, Yong et al., "Ensemble Learning-Based Technique for Force Classifications in Piezoelectric Touch Panels", IEEE Sensors Journal, vol. 20, No. 16, Aug. 16, 2020. (11 pages total).

International Search Report and Written Opinion dated Feb. 21, 2022 by the International Searching Authority in International Application No. PCT/KR2021/016889. (PCT/ISA/220, PCT/ISA/210 and PCT/ISA/237).

Quinn, Philip et al., "Sensing Force-Based Gestures on the Pixel 4", Goggle Research, Jun. 24, 2020. (3 pages total).

Office Action dated Nov. 29, 2023, issued by United States Patent Office in U.S. Appl. No. 18/112,255.

Communication dated Nov. 16, 2023, issued by European Patent Office in European Patent Application No. 21858454.8.

Notice of Allowance dated Mar. 11, 2024, issued by United States Patent Office in U.S. Appl. No. 18/112,255.

* cited by examiner

FIG. 21
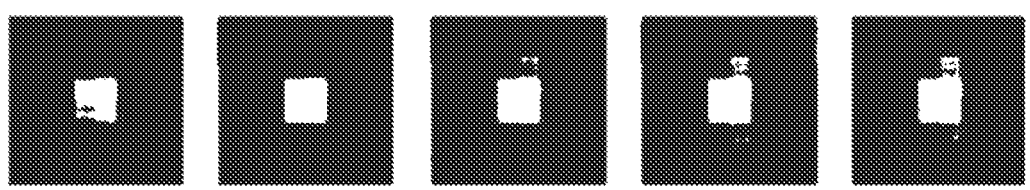
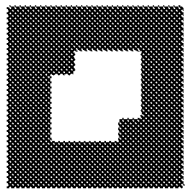
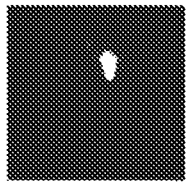

ELECTRONIC DEVICE AND OPERATING METHOD OF THE SAME

CROSS-REFERENCE TO RELATED APPLICATIONS

This application is a bypass continuation application of International Application PCT/KR2022/001706 filed on Feb. 3, 2022, which claims priority to Korean Patent Application No. 10-2021-0050732, filed on Apr. 19, 2021, and Korean Patent Application No. 10-2021-0077426, filed on Jun. 15, 2021, in the Korean Intellectual Property Office, the disclosures of which are incorporated by reference herein in their entireties.

BACKGROUND

1. Field

Embodiments of the disclosure relate to an electronic device for recognizing a user's touch, and an operating method of the electronic device.

2. Description of Related Art

As an input means via which an electronic device can recognize a touch input from a user, a user interface such as a touchscreen, a touchpad, or the like is provided. The electronic device may identify a touch type of the touch input from the user, may perform operations corresponding to various touch types, and thus, may provide the user with an improved device usage experience.

When the electronic device identifies the touch type of the touch input from the user, it is required for the electronic device to correctly identify a touch according to an intention of the touch of the user, by performing touch recognition by applying attributes of touch inputs which vary according to users and include a time in which a user applies a force to a touchscreen, a level of the force applied to the touchscreen, and the like.

Accordingly, provided is a detailed scheme for identifying types of a touch input of a user.

SUMMARY

Provided are an electronic device for identifying touch types of a touch input of a user, and an operating method of the electronic device.

According to a first aspect of the disclosure, a method of identifying a touch type of a user touch input with respect to an electronic device may include: obtaining touch data from the touch input of the user; determining a touch recognition model set including touch recognition models from among a plurality of touch recognition models corresponding to a plurality of partial time periods included in a time period during which the touch input is maintained, wherein the plurality of touch recognition models are trained to identify a touch type of the touch input from the touch data obtained during time periods respectively corresponding to the plurality of touch recognition models; applying the touch data to the touch recognition models included in the touch recognition model set to obtain touch type probability values of the touch input; and identifying the touch type of the touch input, based on the touch type probability values.

According to a second aspect of the disclosure, an electronic device for identifying a touch type of a touch input of a user may include: a user interface configured to obtain touch data from the touch input of the user; a memory storing one or more instructions; and at least one processor configured to execute the one or more instructions stored in the memory to: determine a touch recognition model set including touch recognition models from among a plurality of touch recognition models corresponding to a plurality of partial time periods included in an time period during which the touch input is maintained, wherein the plurality of touch recognition models are trained to identify a touch type of the touch input from the touch data, obtained during time periods respectively corresponding to the plurality of touch recognition models, apply the touch data to the touch recognition models comprised in the touch recognition model set to obtain touch type probability values of the touch input, and identify a touch type of the touch input, based on the touch type probability values.

According to a third aspect of the disclosure, a recording medium may have stored therein a program for performing the method of the first aspect.

BRIEF DESCRIPTION OF THE DRAWINGS

FIG. 21 is a diagram describing a method of obtaining, by an electronic device from touch data, touch occurrence area data indicating an area where a touch input occurs, according to an embodiment of the disclosure.

DETAILED DESCRIPTION

Figure 1:
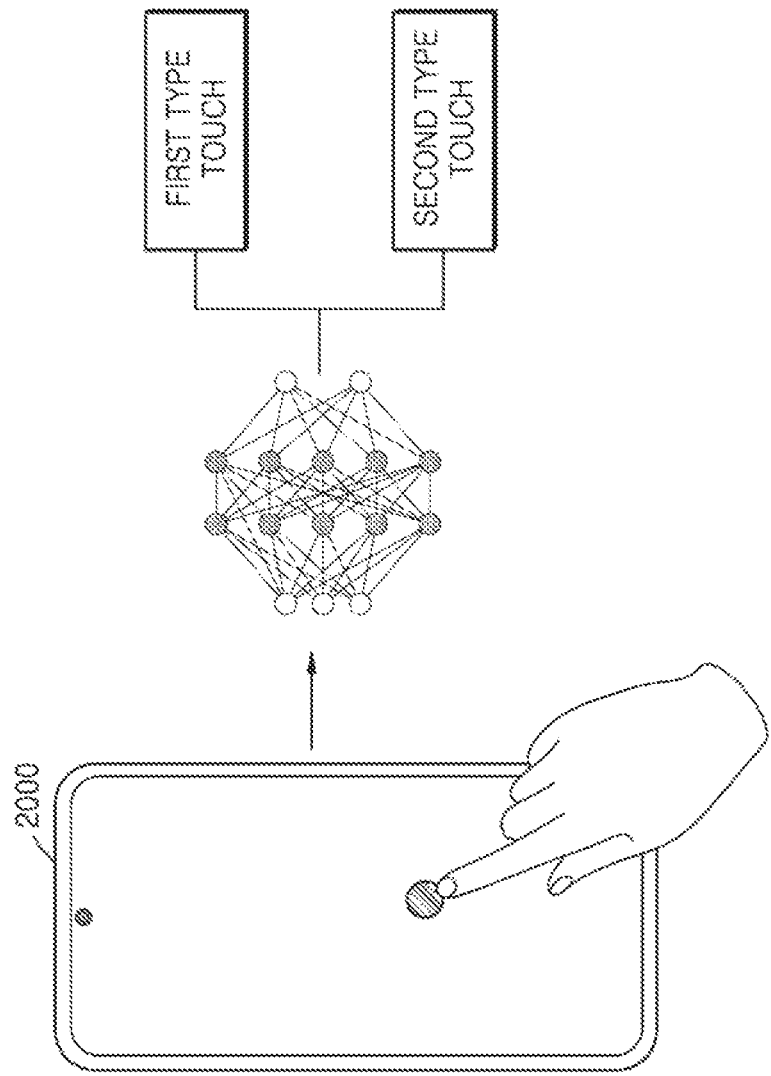
FIG. 1 is a diagram illustrating an example in which an electronic device identifies a touch type of a touch input of a user according to an embodiment of the disclosure.

Throughout the disclosure, the expression "at least one of a, b or c" indicates only a, only b, only c, both a and b, both a and c, both b and c, all of a, b, and c, or variations thereof.

Terms that are used in the specification will be briefly described, and the disclosure will be described in detail.

Although the terms used in the disclosure are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

As used herein, the singular forms are intended to include the plural forms as well, unless the context clearly indicates otherwise. All terms including technical and scientific terms used herein have the same meaning as commonly understood by one of ordinary skill in the art to which this disclosure belongs. While terms as "first," "second," etc., may be used in the specification so as to describe various components, such components must not be limited to the above terms. The above terms are used only to distinguish one component from another.

Throughout the specification, when a part "includes" or "comprises" a component, unless there is a particular description contrary thereto, the part may further include other components, not excluding the other components. Also, the terms such as "unit," "module," or the like used in the specification indicate a unit for processing at least one function or operation, wherein the unit and the module may be embodied as hardware or software or embodied by combining hardware and software.

Hereinafter, embodiments of the disclosure will now be described more fully with reference to the accompanying drawings for one of ordinary skill in the art to be able to perform the disclosure without any difficulty. However, the disclosure may be embodied in many different forms and should not be construed as being limited to the embodiments set forth herein. In addition, parts irrelevant to the description will be omitted in the drawings for a clear description of the disclosure, and like reference numerals will denote like elements throughout the specification.

In embodiments of the disclosure, touch data indicates data obtained from a touch input of a user via a touchscreen of an electronic device, and for example, may include information of a position at which the touch input is received, information of a time in which the touch input is maintained, and information of an area in which the touch input is received.

In embodiments of the disclosure, a touch dataset indicates a set of a plurality of items of touch data. For example, a set of a plurality of items of sample touch data to be described below in embodiments may be referred to as a sample touch dataset, and a set of a plurality of items of training touch data to be described below in embodiments may be referred to as a training touch dataset. The plurality of items of touch data included in the touch dataset may indicate a plurality of items of touch data to which touch types are respectively labeled. Accordingly, as the touch types are labeled to the plurality of items of touch data included in the touch dataset, the plurality of items of touch data may be used to verify or train a touch recognition model.

In embodiments of the disclosure, a touch type of a touch input of a user includes a plurality of touch types. For example, the touch type of the touch input of the user may include a force touch type. A force touch may be a touch that is identified based on strength of a touch force applied to a touchscreen of an electronic device. The force touch may be identified based on a determination of a strength applied by a user to the electronic device according to an area in which the touch input of the user is received and a time duration during which the touch input is received. Alternatively or additionally, the force touch may be identified based on a measurement of the strength applied by the user to the electronic device that may be measured using a pressure detection sensor in a non-limiting example.

In the embodiments of the disclosure, an area in which a touched input of the user is received, also called "touched area" or "touch area" or "touch occurrence area" throughout the specification, may comprise the sum of input recognition elements of a user interface for which a touch is recognized. The recognition may for instance result from the detection a capacitance or by a pressure of a user's finger on the user interface. The touched area may comprise pixels of a touchscreen on which an input is recognized and displayed.

In embodiments of the disclosure, the touch type of the touch input of the user includes different types. For example, the touch type of the touch input of the user may include a normal touch, a long touch, a drag touch, or the like. The normal touch may refer to a touch in which the user presses the touchscreen of the electronic device for a time shorter than a preset standard. The long touch may refer to a touch in which the user presses the touchscreen of the electronic device for a time longer than the preset standard. The drag touch may refer to a touch in which the user moves a touch input to a different area on the touchscreen while the user maintains a pressing gesture onto the touchscreen of the electronic device.

In embodiments of the disclosure, an entire time period of a touch input indicates a time period having a time length (e.g., duration) including a time from a start of a touch input of a user to an end thereof. The entire time period may be a time period having a preset time length.

Alternatively or additionally, the entire time period may be a time period having a time length in which a touch input of a user may be maintained at every time input. That is, the end of the entire period may correspond to a time of the end of the touch input. However, the entire time period is not limited thereto, and may further include a time of a preset length after the end of the touch input. The entire time period may include a plurality of partial time periods to be described below.

In embodiments of the disclosure, a partial time period of a touch input indicates a time period that is included in an entire time period of a touch input and has a preset time length. That is, a partial time period is shorter than the entire time period of a touch input. The partial time period included in the entire time period may be plural in number, and time lengths of respective partial time periods may be equal to or different from each other. Alternatively or additionally, partial time periods may be configured to partially overlap with each other. For example, the partial time periods may be time periods including a first time period of [0 ms, 100 ms], a second time period of [50 ms, 150 ms], and the like which have a preset length of which start time and end time are set. In some embodiments, 0 ms that is a reference time of the partial time periods and may refer to a time point at which a touch input of a user is input.

When the touch input of the user is input, the electronic device identifies a touch type of the user from a plurality of items of touch data respectively corresponding to the partial time periods, thereby analyzing in detail the touch input of the user according to each of the partial time periods.

FIG. 1 is a diagram illustrating an example in which an electronic device 2000 identifies a touch type of a touch input of a user according to an embodiment of the disclosure.

Referring to FIG. 1, the electronic device 2000, according to an embodiment of the disclosure, receives a touch input from a user, and in order to determine a touch type of the touch input of the user, identifies a type of the touch input using touch recognition models configured with respect to the user from among a plurality of trained touch recognition models.

In an embodiment of the disclosure, the electronic device 2000 obtains touch data from the touch input of the user. The electronic device 2000 may obtain the touch data about an area in which the touch input of the user is received via a touchscreen.

In an embodiment of the disclosure, the electronic device 2000 selects a plurality of touch recognition models in order to identify a touch type of the obtained touch data, and identifies the touch type of the touch input of the user by applying the obtained touch data to the selected touch recognition models.

In some embodiments, the plurality of touch recognition models selected by the electronic device 2000 correspond to a plurality of partial time periods in an entire time period of the touch input. Also, the touch recognition models have been trained to respectively identify touch types of the touch input from a plurality of items of touch data obtained from the partial time periods respectively corresponding to the touch recognition models.

In an embodiment of the disclosure, the touch input being input to the electronic device 2000 by the user may vary in a time in which the touch input is maintained, an area to which the touch input is applied, and the like, according to a touch feature of the user. The electronic device 2000 determines, from among the plurality of touch recognition models, a touch recognition model set consisting of touch recognition models to be used to identify the touch input of the user. In some embodiments, the touch recognition model set may have been previously configured with respect to the user.

In an embodiment of the disclosure, the electronic device 2000 identifies the touch type of the touch input of the user by using the touch recognition models included in the touch recognition model set. The touch recognition models included in the touch recognition model set respectively receive a plurality of items of touch data corresponding to the partial time periods of the touch input. The electronic device 2000 combines probability values output from the touch recognition models included in the touch recognition model set, thereby identifying the touch type of the touch input of the user.

In some embodiments, the touch type of the touch input of the user identified by the electronic device 2000 may include a first type touch and a second type touch. For example, the first type touch may be a force touch, and the second type touch may be at least one of a normal touch, a long touch, or a drag touch, which is a touch type other than the force touch.

Figure 2:
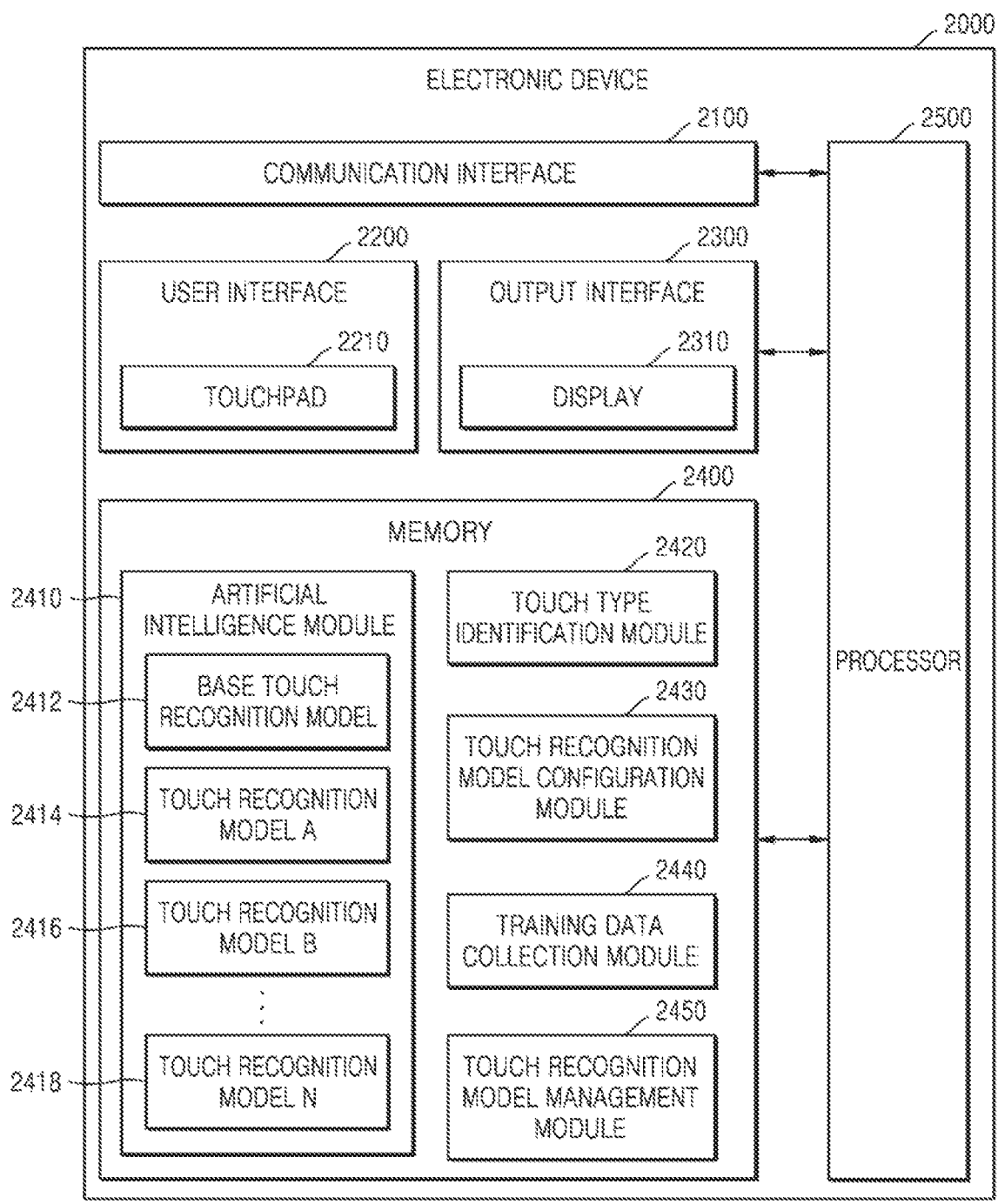
FIG. 2 is a block diagram illustrating a configuration of an electronic device according to an embodiment of the disclosure.

FIG. 2 is a block diagram illustrating a configuration of the electronic device 2000, according to an embodiment of the disclosure.

Referring to FIG. 2, the electronic device 2000 according to an embodiment of the disclosure may include a communication interface 2100, a user interface 2200, an output interface 2300, a memory 2400, and a processor 2500.

The communication interface 2100 performs data communication with a server (not shown), under the control of the processor 2500. Also, the communication interface 2100 may perform data communication with other electronic devices (not shown), such as, for example, neighboring electronic devices.

The communication interface 2100 performs data communication with the server and/or other electronic devices using one or more data communication schemes including a wired local area network (LAN), a wireless LAN, Wi-Fi, Bluetooth, Zigbee, Wi-Fi Direct (WFD), infrared Data Association (IrDA), Bluetooth Low Energy (BLE), near field communication (NFC), wireless broadband Internet (WiBro), Worldwide Interoperability for Microwave Access (WiMAX), shared wireless access protocol (SWAP), Wireless Gigabit Alliance (WiGig), and/or radio frequency (RF) communication.

The communication interface 2100, according to an embodiment of the disclosure, transmits and/or receives data for identifying a force touch to or from an external device (not shown). For example, the communication interface 2100 may receive, from an external server (not shown), a plurality of force touch models pre-trained to identify a force touch.

The user interface 2200 receives user inputs and/or data to control the electronic device 2000. For example, the user interface 2200 may include, but is not limited to, a key pad, a dome switch, a touchpad 2210 (e.g., a touch capacitive type touchpad, a pressure resistive type touchpad, an infrared beam sensing type touchpad, a surface acoustic wave type touchpad, an integral strain gauge type touchpad, a piezo effect type touchpad, or the like), a jog wheel, and/or a jog switch.

The user interface 2200, according to an embodiment of the disclosure, receives a touch input of a user. According to an embodiment of the disclosure, with respect to the touch input of the user which is received via the user interface 2200, the electronic device 2000 may identify a force touch and may perform an operation corresponding to a result of the identification.

The output interface 2300 outputs an audio signal, a video signal, and/or a vibration signal. The output interface 2300 may include a display 2310, a speaker, and/or a vibration motor. The output interface 2300, according to an embodiment of the disclosure, may output information about an operation corresponding to the result of identifying the force touch from an input of the user.

For example, the display 2310 outputs information being processed by the electronic device 2000. In some embodiments, the display 2310 and the touchpad may form a mutual layer structure and may be formed as a touchscreen. In such embodiments, the display 2310 may be configured as an output device 2300 and as an input device 2200. In other embodiments, the display 2310 may include at least one of a liquid crystal display, a thin film transistor-liquid crystal display, an organic light-emitting diode display, a flexible display, a three-dimensional (3D) display, or an electrophoretic display. The electronic device 2000, according to an embodiment of the disclosure, may include two or more displays 2310.

The speaker outputs audio data received from the communication interface 2100 and/or stored in the memory 2400. The vibration motor outputs a vibration signal when a touch is input to the touchscreen 2310. The speaker and the vibration motor, according to an embodiment of the disclosure, may output information about an operation corresponding to a result of identifying a force touch from the touch input of the user.

The memory 2400 stores instructions, a data structure, and/or a program code which may be readable by the processor 2500. In some embodiments of the disclosure, operations performed by the processor 2500 may be implemented by executing instructions and/or codes of a program stored in the memory 2400.

The memory 2400 may include a non-volatile memory and/or a volatile memory. The non-volatile memory may include at least one of a flash memory, a hard disk, a multimedia card memory, a memory card (e.g., a secure digital (SD) or extreme digital (XD) memory card), a random access memory (RAM), a static RAM (SRAM), a read-only memory (ROM), an electrically erasable programmable ROM (EEPROM), a programmable ROM (PROM), a magnetic memory, a magnetic disc, an optical disc, or the like. The volatile memory may include a RAM, an SRAM, or the like.

The memory 2400, according to an embodiment of the disclosure, stores various types of data that can be used to identify a force touch. For example, the memory 2400 may have stored therein an artificial intelligence (AI) module 2410 including a plurality of touch recognition models to identify a force touch.

In an embodiment of the disclosure, the AI module 2410 may include a base touch recognition model 2412 and a plurality of touch recognition models 2414, 2416 and 2418 (i.e., touch recognition model A 2414, touch recognition model B 2416, and touch recognition model N 2418).

In an embodiment of the disclosure, the base touch recognition model 2412 and the plurality of touch recognition models 2414, 2416 and 2418 in the AI module 2410 are pre-trained AI models configured to output a probability value of a touch type with respect to touch input information of a user, based on training touch data. According to an embodiment of the disclosure, the plurality of touch recognition models 2414, 2416 and 2418 in the AI module 2410 respectively correspond to partial time periods in an entire time period in which a touch input is maintained, and, in order to learn a touch input feature in each corresponding period, have been individually trained based on a plurality of items of touch data respectively corresponding to the partial time periods being different from with each other.

The electronic device 2000 uses the plurality of touch recognition models 2414, 2416 and 2418 to determine a touch type of a touch input according to a feature of the touch input of a user who applies a force in each of the time periods, based on a plurality of items of touch data obtained while the touch input is maintained.

In an embodiment of the disclosure, the base touch recognition model 2412 is an AI model trained to identify a touch type based on touch data of an entire time period of a touch input. In some embodiments, the base touch recognition model 2412 may be a general-purpose AI model trained based on a touch dataset of an entire time period which is a set of a plurality of items of touch data of the entire time period.

For example, the touch dataset of the entire time period is a dataset consisting of a plurality of items of touch data corresponding to the entire time period of a touch input. Also, the plurality of items of touch data included in the touch dataset of the entire time period are a plurality of items of touch data to which touch types are labeled to train the base touch recognition model 2412. Label values of the plurality of items of touch data included in the touch dataset of the entire time period are true label values labeled using a pressure sensor and indicating whether respective items of touch data are a force touch type or another touch type.

In an embodiment of the disclosure, each touch recognition model of the plurality of touch recognition models 2414, 2416 and 2418 is an AI model trained to identify a touch type based on touch data obtained from a partial time period included in an entire time period of a touch input. Each touch recognition model of the plurality of touch recognition models 2414, 2416 and 2418 is an AI model trained based on a touch dataset of a partial time period which may a set of a plurality of items of touch data of the partial time period. For example, the partial time period is one of a plurality of partial time periods included in an entire time period of a touch input of a user. The plurality of touch recognition models 2414, 2416 and 2418 respectively correspond to the partial time periods being different from each other.

A touch dataset of a partial time period is a dataset consisting of a plurality of items of touch data corresponding to the partial time period of a touch input. Also, a plurality of items of touch data included in the touch dataset of the partial time periods are a plurality of items of touch data to which touch types are labeled to train the plurality of touch recognition models 2414, 2416 and 2418. Label values of the plurality of items of touch data included in the touch dataset of the partial time period are true label values labeled using a pressure sensor and indicating whether respective items of touch data are a force touch type or another touch type.

In some embodiments, the memory 2400 may have stored therein data and/or program instruction codes which correspond to a touch type identification module 2420, a touch recognition model configuration module 2430, a training data collection module 2440, and a touch recognition model management module 2450.

The processor 2500 controls all operations of the electronic device 2000. For example, the processor 2500 may control overall operation of the communication interface 2100, the user interface 2200, and the output interface 2300 by executing one or more instructions of a program stored in the memory 2400.

The processor 2500 may be configured as, but is not limited to, at least one of a central processing unit, a microprocessor, a graphics processing unit, application specific integrated circuits (ASICs), digital signal processors (DSPs), digital signal processing devices (DSPDs), programmable logic devices (PLDs), field programmable gate arrays (FPGAs), an application processor (AP), a neural processing unit (NPU), or an AI-dedicated processor designed to have a hardware structure specified to process an AI model.

In an embodiment of the disclosure, the processor 2500 identifies a touch type of a touch input of a user by executing the touch type identification module 2420. The processor 2500 outputs a result of the identifying of the touch type of the touch input of the user. In some embodiments, the process 2500 performs the identifying using the touch type identification module 2420 and the AI module 2410. The touch type identification module 2420 identifies the touch type of the touch input of the user using the base touch recognition model 2412 and the plurality of touch recognition models 2414, 2416 and 2418.

The touch type identification module 2420 determines, using the base touch recognition model 2412, whether to use at least one of the plurality of touch recognition models 2414, 2416 and 2418 to identify the touch type of the touch input of the user.

When the touch input of the user is received, the processor 2500 applies touch data of an entire time period of the touch input to the base touch recognition model 2412, and based on reliability of a touch type probability value output from the base touch recognition model 2412, determines whether to identify the touch type of the touch input of the user using at least one of the plurality of touch recognition models 2414, 2416 and 2418.

For example, the processor 2500 may determine whether to use at least one of the plurality of touch recognition models 2414, 2416 and 2418, based on a threshold value with respect to reliability of a probability value output from the base touch recognition model 2412.

For example, when the probability value is equal to or greater than the threshold value and thus it is determined that a touch type identification result from the base touch recognition model 2412 is reliable, the processor 2500 may identify the touch type, based on the probability value output from the base touch recognition model 2412. Also, when the output probability value is less than the threshold value and thus it is determined that the touch type identification result from the base touch recognition model 2412 is unreliable, the processor 2500 may select, according to a preset criterion, touch recognition models included in the plurality of touch recognition models 2414, 2416 and 2418 to identify the touch type of the touch input of the user.

For example, in an embodiment where the processor 2500 determines to identify the touch type of the touch input using at least one of the plurality of touch recognition models 2414, 2416 and 2418, the processor 2500 determines a touch recognition model set by selecting at least one of the plurality of touch recognition models 2414, 2416 and 2418 corresponding to a plurality of partial time periods included in a time in which the touch input is maintained. The touch recognition model set consist of touch recognition models for identifying a type of a touch input of a user, and may be previously set with respect to the user, by the touch recognition model configuration module 2430 as described in further detail below.

In an embodiment of the disclosure, the touch type identification module 2420 identifies the touch type of the touch input of the user by applying touch data to each of the touch recognition models included in the touch recognition model set, the touch data being obtained while the touch input of the user is maintained. For example, the touch type identification module 2420 may identify the touch type of the touch input by respectively applying, to the touch recognition models included in the touch recognition model set, a plurality of items of touch data of partial time periods included in an entire time period during which the touch input is maintained.

The touch type identification module 2420 obtains, from the touch recognition models included in the touch recognition model set, touch type probability values according to the partial time periods respectively corresponding to the touch recognition models included in the touch recognition model set. The touch type identification module 2420 identifies the touch type of the touch input of the user by combining the obtained probability values.

A method by which the processor 2500, according to an embodiment of the disclosure, identifies a touch type of a user using the touch type identification module 2420 will be described in further detail in reference to FIGS. 8 and 11.

In an embodiment of the disclosure, the processor 2500 executes the touch recognition model configuration module 2430, thereby setting the touch recognition model set consisting of the touch recognition models for identifying the touch type of the touch input of the user.

In order to identify a touch type of a user based on a feature of a touch input of the user who applies a force in each of time periods, the processor 2500 sets a touch recognition model set consisting of touch recognition models used when the user performs a touch input. As the touch recognition model set is configured with respect to the user in order to identify a touch type of the user based on a feature of a touch input of the user who applies a force in each of partial time periods, touch recognition models included in the touch recognition model set may vary for each of users. Also, the touch recognition model set that is configured with respect to the user may be configured among the plurality of touch recognition models 2414, 2416 and 2418, based on the feature of the touch input of the user.

In some embodiments, the processor 2500 guides a user with a sample touch input in order to set a touch recognition model set used for the user. The processor 2500 obtains sample touch data corresponding to the sample touch input. The processor 2500 identifies a feature of a touch input of the user, based on the sample touch data obtained from the user, and determines the touch recognition model set to be configured with respect to the user.

The processor 2500 outputs, to the user, a user interface for guiding inputs of a first type touch and a second type touch, and thus obtains sample touch data corresponding to the first type touch and sample touch data corresponding to the second type touch. For example, the first type touch may be a force touch, and the second type touch may be a long touch.

Based on a plurality of items of sample touch data obtained from the sample touch input by the user, the processor 2500 determines the touch recognition model set consisting of touch recognition models used to identify a touch type of a touch input of the user, the touch recognition models being from among the plurality of touch recognition models 2414, 2416 and 2418 included in the AI module 2410.

The processor 2500 inputs first type sample touch data and second type sample touch data, obtained from the user, to the plurality of touch recognition models 2414, 2416 and 2418, and thus, outputs sample touch type probability values indicating a result of inference with respect to a touch type of the sample touch data.

The processor 2500 calculates accuracy of the sample touch type probability values indicating the result of inference with respect to the touch type of the sample touch data. The processor 2500 may calculate accuracy of inference with respect to a touch type of a sample touch input being input to each of the plurality of touch recognition models 2414, 2416 and 2418, based on the sample touch type probability values and the touch type guided to the user in the sample touch input.

The processor 2500 determines the touch recognition model set consisting of the touch recognition models used when the user performs a touch input in the future.

Figure 9:
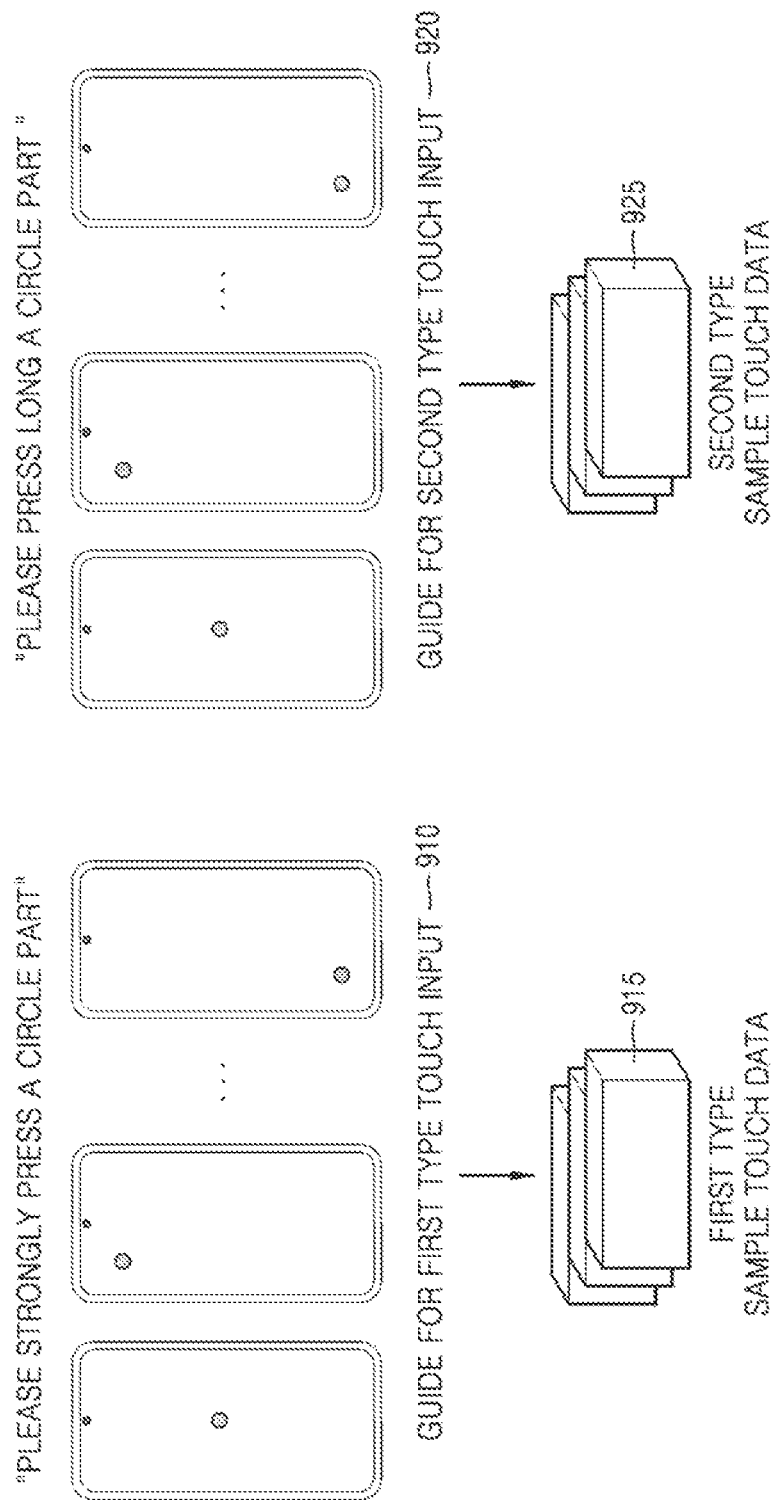
FIG. 9 is a diagram describing a method of receiving a sample touch input from a user and determining a touch recognition model set by an electronic device, according to an embodiment of the disclosure.
Figure 10:
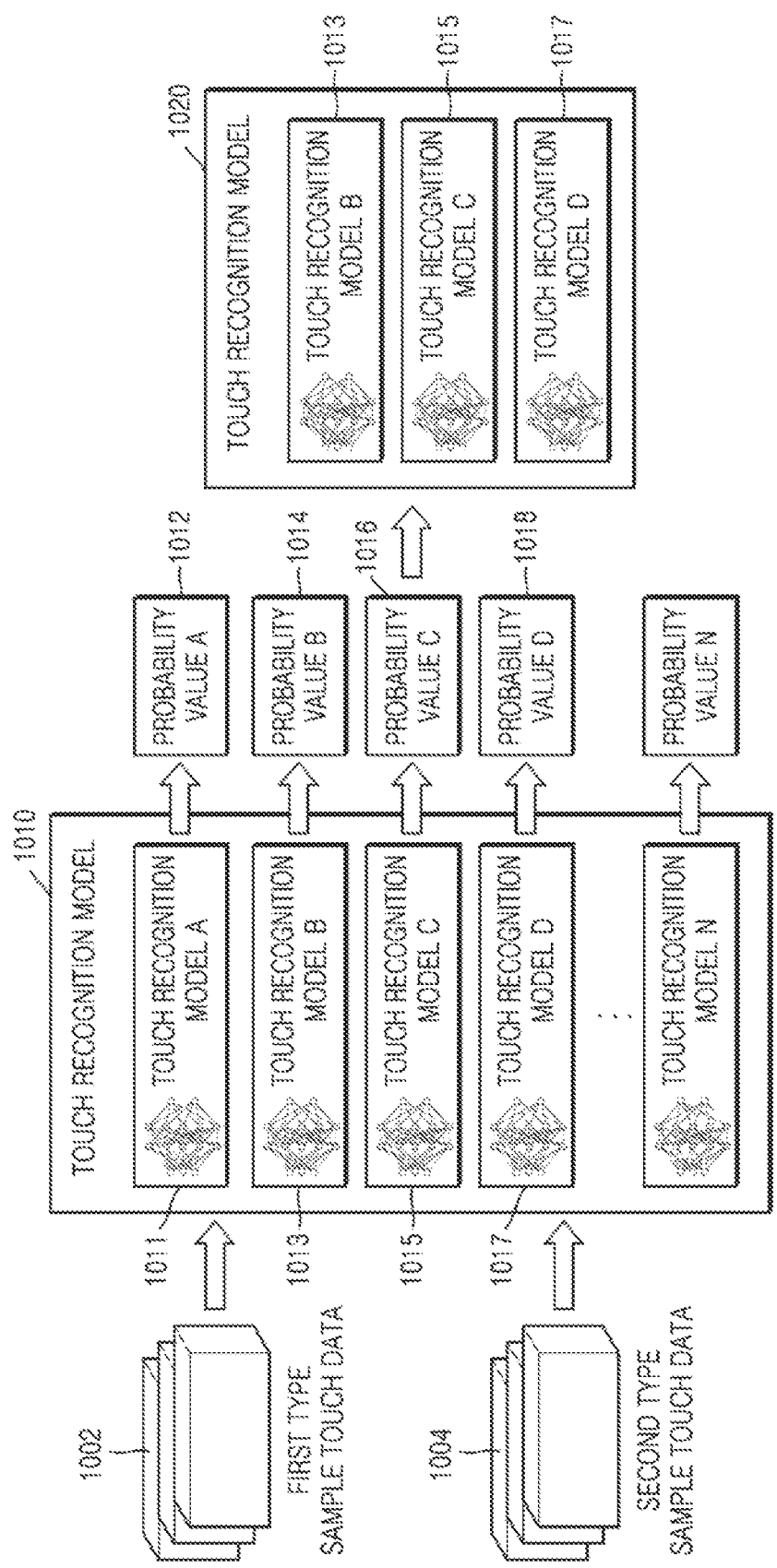
FIG. 10 is a diagram describing a method of determining a touch recognition model set from among a plurality of touch recognition models by an electronic device using touch data obtained from a sample touch input, according to an embodiment of the disclosure.

A method by which the processor 2500, according to an embodiment of the disclosure, sets a touch recognition model set consisting of touch recognition models used for a user is described in further detail in reference to FIGS. 9 and 10.

In an embodiment of the disclosure, the processor 2500 executes the training data collection module 2440, thereby obtaining touch data corresponding to a touch input of a user when the touch input of the user is received. The processor 2500 generates training touch data by labeling a label value of a touch type to the obtained touch data.

If or when the touch input of the user is maintained, the processor 2500 obtains, at preset time intervals, touch data about an area in which the touch input of the user is received via a touchscreen. Touch data obtained at preset time intervals stored in the electronic device 2000 and/or a database of a server (not shown).

When the processor 2500 obtains touch data of the user and generates training touch data, the processor 2500 stores the touch data to correspond to a partial time period using a plurality of pieces of partial time period information. For example, with respect to each of partial time periods, the training data collection module 2440 may configure, as one dataset, a plurality of items of touch data corresponding to a partial time period. For example, a touch dataset of an $N^{th}$ time period may be generated by configuring, as one dataset, a plurality of items of touch data corresponding to the $N^{th}$ time period. A touch dataset of each of the partial time periods may be used to train a touch recognition model corresponding to each of the partial time periods.

The processor 2500 obtains sample touch data corresponding to a sample touch input, from the sample touch input a user inputs to set the electronic device 2000. The obtained sample touch data is used to set, by applying a feature of a touch input of the user, a touch recognition model set used for the user.

The processor 2500 obtains another touch data corresponding to a different touch input, from the different touch input being input as the user uses the electronic device 2000. That is, the other touch data may be used to update a touch recognition model.

When the processor 2500 obtains touch data, the processor 2500 labels and stores a touch type corresponding to the touch data, thereby generating training touch data.

In an embodiment of the disclosure, when a user inputs a touch input determined as a force touch while the user uses the electronic device 2000 in a daily life, the processor 2500 outputs a user interface corresponding to the force touch. When the user performs an operation corresponding to the force touch, the processor 2500 labels, as 'force touch', touch data of the touch input determined as the force touch, and stores the touch data.

A method by which the processor 2500, according to an embodiment of the disclosure, accumulates touch data of a user in a database is described in further detail in reference to FIGS. 14-18.

The processor 2500 identifies a training touch dataset used to update a touch recognition model. That is, the processor 2500 identifies the training touch dataset used to update the touch recognition model, from among a plurality of items of touch data of the user which are accumulated in the database as the user uses the electronic device 2000.

The processor 2500 classify a plurality of items of training touch data stored in the database into a plurality of touch data subsets. A touch data subset indicates a dataset configured to include some of the plurality of items of training touch data stored in the database in order to generate a new touch recognition model. In some embodiments, other touch recognition models may be generated based on respective touch data subsets. Also, a training touch dataset to be used to update a touch recognition model may be identified from a touch data subset.

The processor 2500 verifies the accuracy of the other touch recognition models generated based on the respective touch data subsets. In addition, with respect to other touch recognition models identified to have high accuracy based on a result of the verification, the processor 2500 identifies training touch data subsets as a training touch data subset for updating a touch recognition model, the training touch data subsets having been used in training of another touch recognition model having high accuracy.

Figure 19:
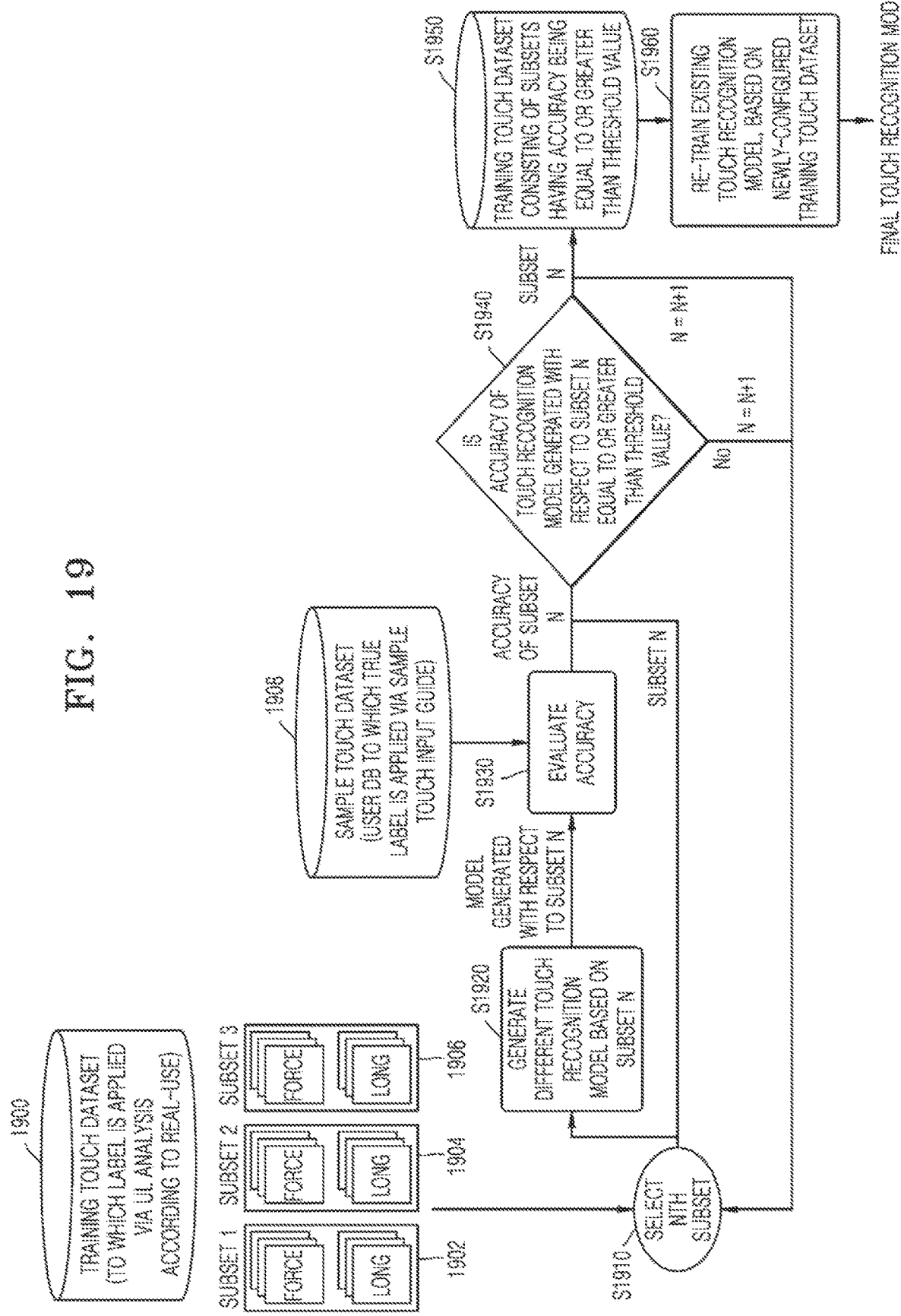
FIG. 19 is a diagram of method of evaluating reliability of labeled training touch data, according to an embodiment of the disclosure.

A method by which the processor 2500, according to an embodiment of the disclosure, identifies a plurality of items of touch data of a user as a training touch dataset is described in further detail in reference to FIG. 19.

In an embodiment of the disclosure, the processor 2500 generates and updates a touch recognition model by executing the touch recognition model management module 2450.

In order to verify touch data accumulated in the database as the user uses the electronic device 2000, the processor 2500 generates another touch recognition model. For example, the touch recognition model management module 2450 may generate other touch recognition models respectively corresponding to a plurality of touch data subsets, based on the respective touch data subsets generated using the training data collection module 2440. The training data collection module 2440 identifies, using the generated other touch recognition models, training touch data to update the base touch recognition model 2412 and the plurality of touch recognition models 2414, 2416 and 2418 included in the AI module 2410.

The processor 2500 updates the base touch recognition model 2412 and the plurality of touch recognition models 2414, 2416 and 2418 stored in the electronic device 2000.

The processor 2500 updates the base touch recognition model 2412 and the plurality of touch recognition models 2414, 2416 and 2418 stored in the electronic device 2000, based on the training touch data identified by the training data collection module 2440.

The processor 2500 identifies a distribution of probability values, based on touch data of a user obtained from the user, the probability values being output as a result of identifying a touch type of a touch input of the user. The processor 2500 updates, based on the identified distribution of the probability values, a threshold value for the base touch recognition model 2412 and the plurality of touch recognition models 2414, 2416 and 2418 included in the AI module 2410 to identify the touch type. A method by which the processor 2500, according to an embodiment of the disclosure, updates the threshold value for the base touch recognition model 2412 and the plurality of touch recognition models 2414, 2416 and 2418 included in the AI module 2410 to identify the touch type is described in further detail in reference to FIGS. 20A-20C.

Figure 3:
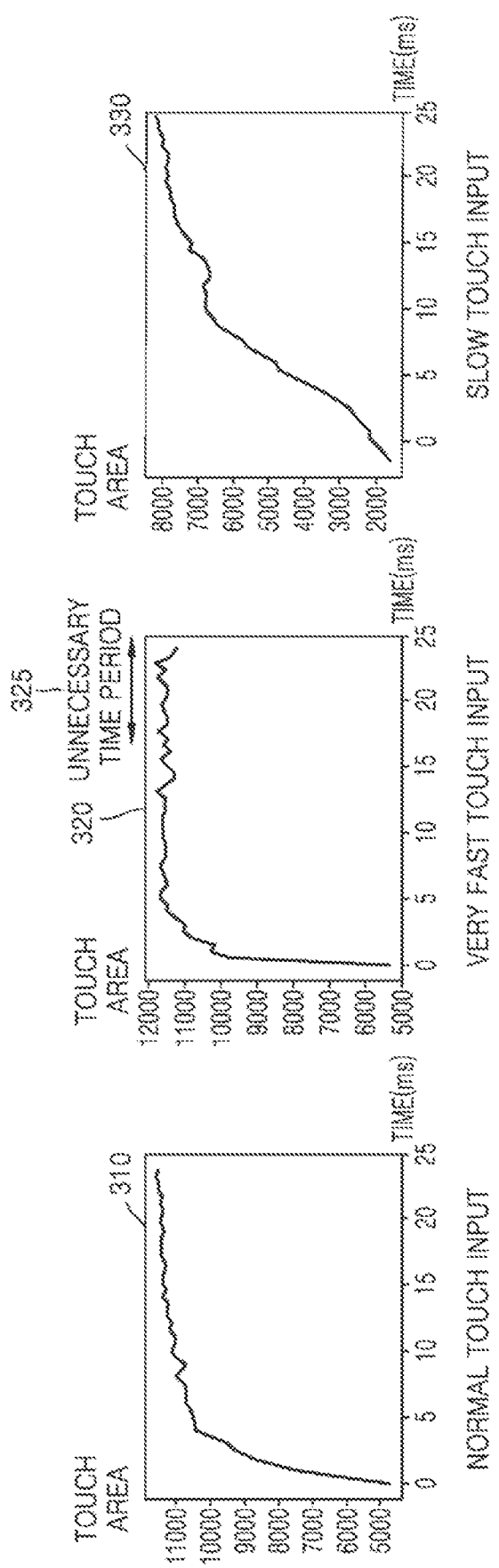
FIG. 3 is a diagram describing an example of a touch input of a user being input to an electronic device, according to an embodiment of the disclosure.

FIG. 3 is a diagram describing an example of a touch input of a user being input to the electronic device 2000, according to an embodiment of the disclosure.

Referring to FIG. 3, a first graph 310, a second graph 320, and a third graph 330 indicate graphed touch data obtained from a touch input being input to the electronic device 2000. A Y-axis of a graph indicates an area in which an obtained touch input is received, and an X-axis of the graph indicates a time in which the touch input is received.

In an embodiment of the disclosure, the way various users using the electronic device 2000 input their touch inputs may vary. That is, a time in which a force is applied to a touchscreen, a level of the applied force (on a touched area), and the like may differ by the users.

For example, as shown in the first graph 310, a touched area of a touch input of a first user may be input as a pattern in which the touched area is increased in a first time period (e.g., [0 ms, 5 ms]) and a second time period (e.g., [5 ms, 10 ms]) in which the touch input is received, and then is gently increased as an increase in the touched area is decreased in a time period thereafter. In other words, the touch pattern of the first user may be a touch pattern in which a force is applied in the first and the second time period (e.g., [0 ms, 10 ms]) in which the touched area is increased (e.g., a user that performs a normal touch input).

In another example, as shown in the second graph 320, a touched area of a touch input of a second user may be input as a pattern in which the touched area is further sharply increased in a first time period (e.g., [0 ms, 5 ms]), compared to the first graph 310, and then is not increased and is saturated in a time period thereafter. In other words, a touch pattern of the second user may be a touch pattern in which a force is applied in a first time period (e.g., [0 ms, 5 ms]) in which the touched area is increased. In addition, an increase in the touched area of the touch input of the second input may be faster than the first user, and thus, the touch input of the second user may be a touch of applying a stronger force than the touch input of the first user (e.g., a user who performs a fast touch input). Therefore, when a user of the electronic device 2000 is a user who performs a fast touch input as shown in the second graph 320, a touch input is fast saturated, and thus, touch data of the second user which is included in a fourth time period to a fifth time period (e.g., [15 ms, 25 ms]) may not be valuable to identify a touch type of a touch input of the second user. That is, the fourth time period and the fifth time period comprising an unnecessary time period 325 during which the touch input is saturated may not be used to identify the touch input.

In another example, as shown in the third graph 330, a touched area of a touch input of a third user may be input as a pattern in which the touched area is gently increased in a first time period to a fifth time period (e.g., [0 ms, 25 ms]) in which the touch input is received. In other words, the touch pattern of the third user may be a touch pattern in which a force is applied in a second time period to a third time period (e.g., [10 ms, 20 ms]) in which the touched area is increased. In addition, an increase in the touched area of the touch input of the third input may be slower than the first user, and thus, the touch input of the second user may be a touch of applying a weaker force than the touch input of the first user (e.g., a user who performs a slow touch input).

As described above, with respect to a touch input of a user being input to the electronic device 2000, touch patterns (e.g., a time of applying a force, a level of the force being applied, etc.) may differ in different users using the electronic device 2000. Therefore, the electronic device 2000, according to an embodiment of the disclosure, may identify, based on a touch pattern of a user, a touch type of the user from touch data of a primary partial time period in which a force is applied from a touch input of the user, and thus, may provide personalized touch recognition.

The electronic device 2000 may exclude a touch recognition model corresponding to a partial time period determined to be unnecessary touch data (e.g., touch input of unnecessary time period 325) from among a plurality of touch recognition models corresponding to a plurality of partial time periods, and may determine touch recognition models for identifying a type of a touch input of a user. A method by which the electronic device 2000 sets a touch recognition model set consisting of touch recognition models used for a user is described in further detail in reference to FIGS. 9 to 10.

Figure 4:
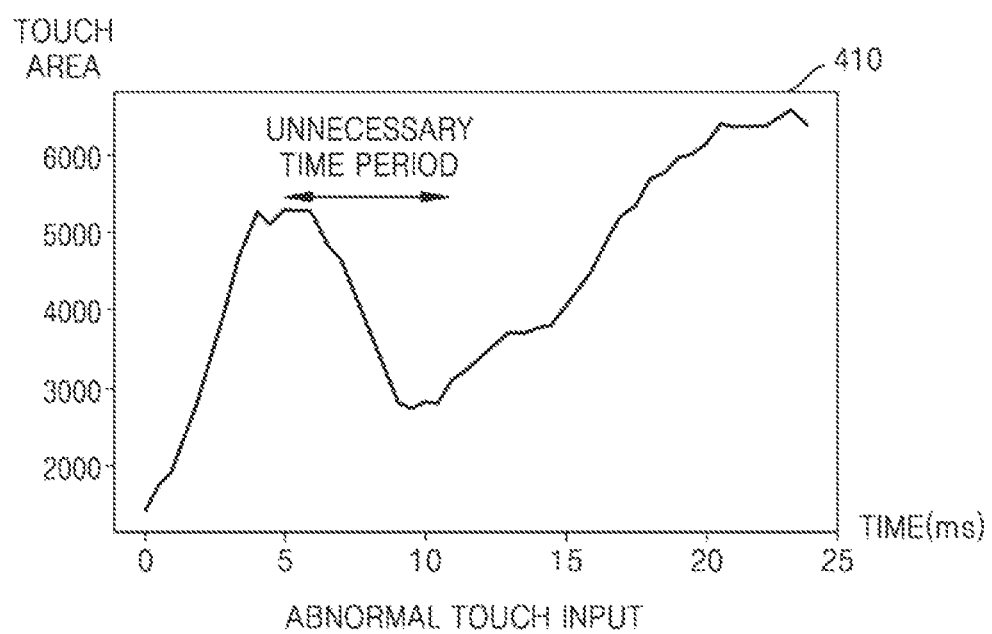
FIG. 4 is a diagram describing another example of a touch input of a user being input to an electronic device, according to an embodiment of the disclosure.

FIG. 4 is a diagram describing another example of a touch input of a user being input to the electronic device 2000, according to an embodiment of the disclosure.

Referring to FIG. 4, a fourth graph 410 indicates graphed touch data obtained from a touch input of a user which is input to the electronic device 2000. A Y-axis of a graph indicates an area in which an obtained touch input is received, and an X-axis of the graph indicates a time in which the touch input is received.

In an embodiment of the disclosure, a touch input of a user may be a touch input determined as an abnormal touch input.

For example, as shown in the fourth graph 410, the touch input of the user may be input as a pattern in which a touched area is increased in a first time period (e.g., [0 ms, 5 ms]) in which the touch input is received, the touched area is decreased in a second time period (e.g., [5 ms, 10 ms]), and then the touched area is gently increased in a third time period to a fifth time period (e.g., [10 ms, 25 ms]). In this case, the electronic device 2000 may determine touch data obtained in the second time period (e.g., [5 ms, 10 ms]) to be unnecessary touch data, and thus, may not use the touch data of the second time period (e.g., [5 ms, 10 ms]) in identifying a touch type of the touch input of the user. The electronic device 2000 may exclude a touch recognition model corresponding to a partial time period determined to be unnecessary touch data from among a plurality of touch recognition models corresponding to a plurality of partial time periods, and thus, may determine touch recognition models for identifying a type of a touch input of a user. A method by which the electronic device 2000 sets a touch recognition model set consisting of touch recognition models used for a user is described in further detail in reference to FIGS. 9 to 10.

Figure 5:
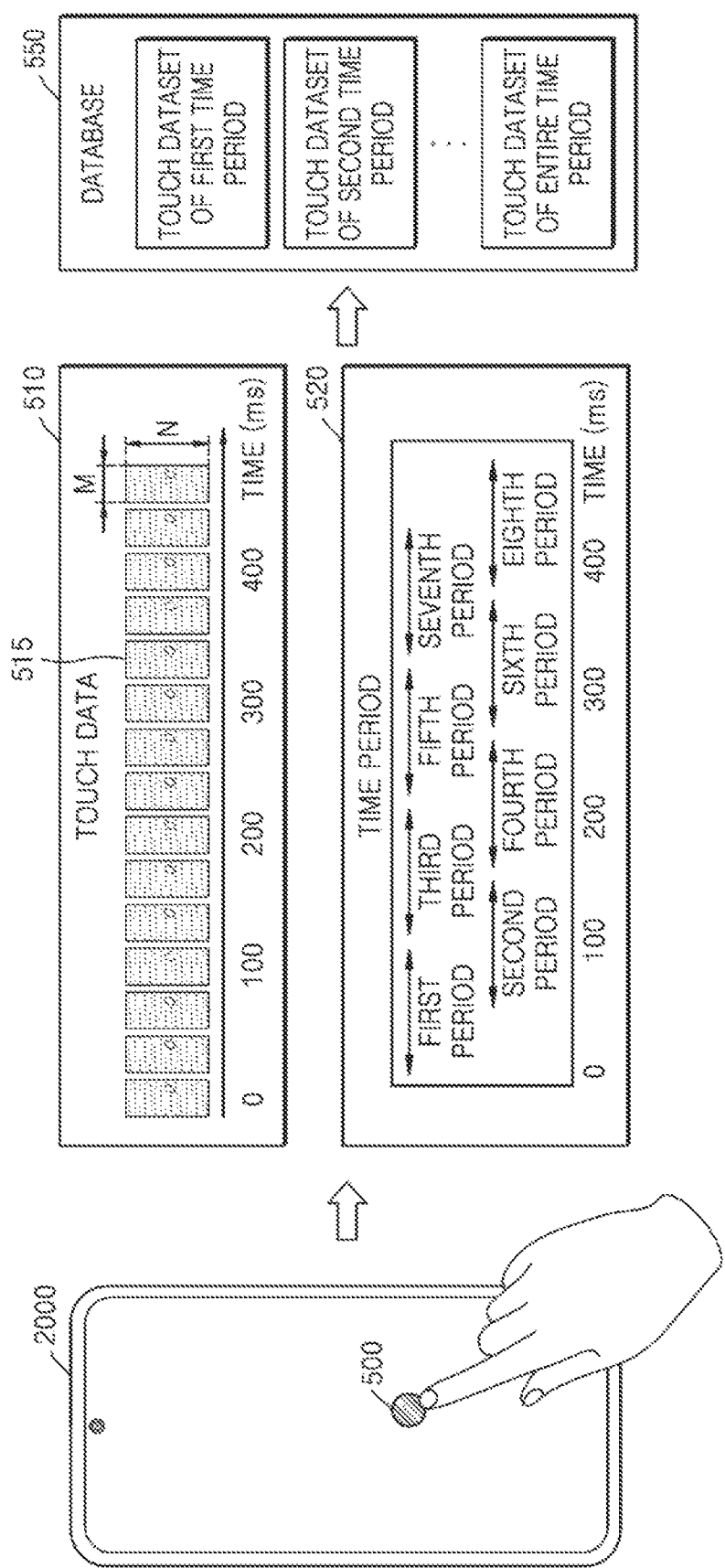
FIG. 5 is a diagram describing a method by which an electronic device obtains touch data from a touch input of a user, according to an embodiment of the disclosure.

FIG. 5 is a diagram describing a method by which the electronic device 2000 obtains touch data from a touch input of a user, according to an embodiment of the disclosure.

In an embodiment of the disclosure, the electronic device 2000 obtains touch data 510 about an area 500 in which a touch input of a user is received via a touchscreen.

In an embodiment of the disclosure, the electronic device 2000 may obtain an image frame of a preset size of M×N including the area 500 in which the touch input of the user is received.

For example, the electronic device 2000 may obtain an image frame of a size of P×P at 1/T Hz. That is, in an embodiment of the disclosure, the electronic device 2000 may obtain the image frame of the size of P×P at time intervals of T ms, and thus, may obtain K image frames.

The electronic device 2000 may apply obtained touch data 510 to a touch recognition model, and thus, may identify a touch type of the user.

The electronic device 2000 may store, in a database 550, the touch data 510 that is obtained image frames. For example, the touch data 510 stored in the database 550 may be data to which a touch type corresponding to touch data is labeled to train a touch recognition model.

When the electronic device 2000, according to an embodiment of the disclosure, stores the touch data 510 in the database 550, the electronic device 2000 may store the touch data 510 to correspond to a plurality of partial time periods 520 using a plurality of pieces of preset partial time period information.

For example, the plurality of preset partial time periods 520 may include a plurality of time periods such as a first time period of [0 ms, 100 ms], a second time period of [50 ms, 150 ms], a third time period of [100 ms, 200 ms], a fourth time period of [150 ms, 250 ms], a fifth time period of [200 ms, 300 ms], a sixth time period of [250 ms, 350 ms], a seventh time period of [300 ms, 400 ms], and an eighth time period of [350 ms, 450 ms]. The plurality of preset partial time periods 520 may be configured to be a same time interval, but is not limited thereto, and thus, may be configured to be different time intervals. Also, each of the plurality of preset partial time periods 520 may have a time period shared between adjacent partial time periods, but is not limited thereto.

The electronic device 2000 may configure the touch data 510 as a training touch dataset to correspond to each of the plurality of preset partial time periods 520, and may store it in the database 550. For example, a touch type may be labeled to the touch data 510 included in the training touch dataset for training of a touch recognition model.

For example, the electronic device 2000 may configure a dataset such that a plurality of items of touch data corresponding to a first period from among the touch data 510 can be included in a touch dataset of a first time period. Also, the electronic device 2000 may configure a dataset such that a plurality of items of touch data corresponding to a second period from among the touch data 510 can be included in a touch dataset of a second time period. In some embodiments, the electronic device 2000 may configure a dataset such that the entirety of the touch data 510 can be included in a touch dataset of an entire time period.

When the electronic device 2000, according to an embodiment of the disclosure, stores the touch data 510 configured as a touch dataset in the database 550, touch data from among the touch data 510 which corresponds to a particular time may be redundantly stored in touch datasets of various time periods.

For example, a particular time of '300 ms' from among the plurality of partial time periods 520 may be a time included in a fifth period and a sixth period. For example, the electronic device 2000 may configure touch data 515 obtained at the particular time of '300 ms' to be included in each of a touch dataset of a fifth time period and a touch dataset of a sixth time period.

When the electronic device 2000, according to an embodiment of the disclosure, stores the touch data 510 in the database 550, the electronic device 2000 may not use partial time period information, and may store the touch data 510 in the database 550 such that the touch data 510 obtained in an entire time period of a touch input can be included in a touch dataset of the entire time period.

Figure 6:
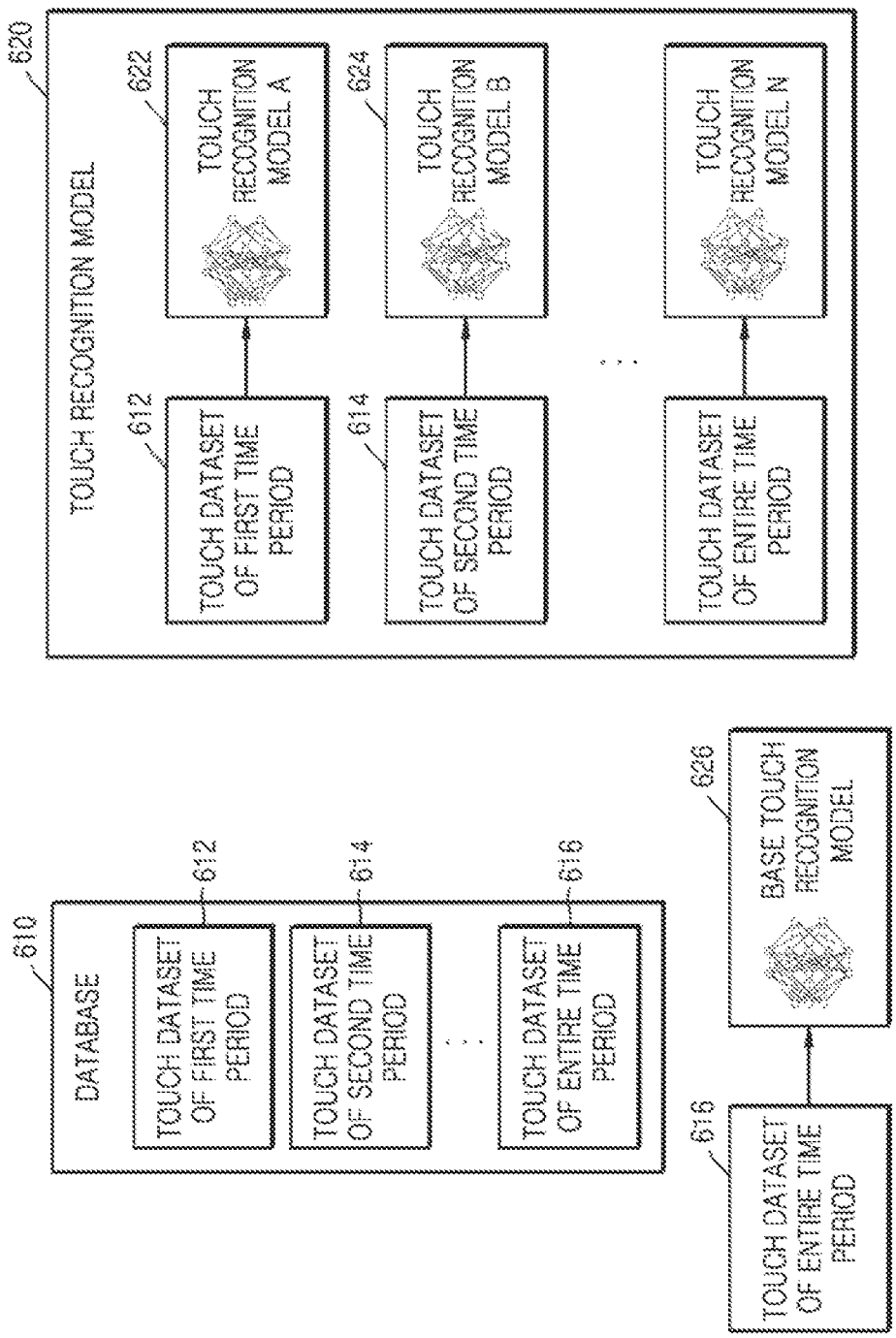
FIG. 6 is a diagram describing touch recognition models trained using obtained touch data, according to an embodiment of the disclosure.

FIG. 6 is a diagram describing touch recognition models trained using obtained touch data, according to an embodiment of the disclosure.

The trained touch recognition models used by the electronic device 2000, according to an embodiment of the disclosure, include a base touch recognition model 626 and a plurality of touch recognition models 620.

In an embodiment of the disclosure, the plurality of touch recognition models 620 and the base touch recognition model 626 are the touch recognition models trained to identify a touch type of a touch input of a user.

For example, the plurality of touch recognition models 620 and the base touch recognition model 626 may be AI models configured to receive an input of touch data of a user and to output a probability of a user's touch input being a first type touch. In another example, the plurality of touch recognition models 620 and the base touch recognition model 626 may be AI models configured to receive an input of touch data of a user and to output a result of inference with respect to a touch type of a user's touch input.

The plurality of touch recognition models 620 and the base touch recognition model 626 may be trained based on at least some of a plurality of training touch datasets stored in a database 610.

In an embodiment of the disclosure, the base touch recognition model 626 may be a general-purpose AI model trained based on a touch dataset 616 of an entire time period of a touch input. For example, the touch dataset 616 of the entire time period may be a dataset consisting of a plurality of items of touch data about the entire time period of the touch input. Also, the plurality of items of touch data included in the touch dataset 616 of the entire time period may be a plurality of items of touch data to which touch types are labeled to train the base touch recognition model 626. Label values of the plurality of items of touch data included in the touch dataset 616 of the entire time period may be true label values labeled using a pressure sensor and indicating whether respective items of touch data are a force touch type or another touch type.

The electronic device 2000 may output, using the base touch recognition model 626, a probability value indicating whether a touch type of the touch input of the user is a first type touch input. When the touch input of the user is received, the electronic device 2000 may obtain touch data during an entire time period that is a time in which the touch input of the user is maintained. The electronic device 2000 may apply the touch data of the entire time period to the base touch recognition model 626, and thus, may output a touch type probability value of the touch input of the user.

In an embodiment of the disclosure, the plurality of touch recognition models 620 may each be an AI model configured to identify a type of a touch input of a user from touch data obtained in a partial time period. For example, the AI model may have been trained based on a dataset of a partial time period that is a set of a plurality of items of touch data corresponding to a preset partial time period. That is, the preset partial time period may be one of a plurality of partial time periods included in an entire time period in which the touch input of the user is maintained. A touch dataset of a partial time period may be a dataset consisting of a plurality of items of touch data corresponding to the partial time period of a touch input. Also, the plurality of items of touch data included in the touch dataset of the partial time period may be a plurality of items of touch data to which touch types are labeled to train a plurality of touch recognition models. Label values of the plurality of items of touch data included in the touch dataset of the partial time period may be true label values labeled using a pressure sensor and indicating whether respective items of touch data are a force touch type or another touch type.

The plurality of touch recognition models 620 may be AI models respectively corresponding to different partial time periods.

For example, a touch recognition model A 622 included in the plurality of touch recognition models 620 may be an AI model trained based on a touch dataset 612 of a first time period which consists of a plurality of items of training touch data corresponding to the first time period. Also, a touch recognition model B 624 included in the plurality of touch recognition models 620 may be an AI model trained based on a touch dataset 614 of a second time period which consists of a plurality of items of training touch data corresponding to the second time period. In a similar manner, a touch recognition model N included in the plurality of touch recognition models 620 may be an AI model trained based on a touch dataset of an $N^{th}$ time period which consists of a plurality of items of training touch data corresponding to the $N^{th}$ time period. The electronic device 2000 may output, using the plurality of touch recognition models 620, probability values indicating whether a touch type of a touch input of a user is a first type touch input. For example, the probability values output from the plurality of touch recognition models 620 may be touch type probability values of the touch input of the user, the touch input being identified from touch data corresponding to each of partial time periods.

The electronic device 2000, according to an embodiment of the disclosure, may identify a touch type of a touch input of a user using at least one of the base touch recognition model 626 or the plurality of touch recognition models 620.

Figure 7:
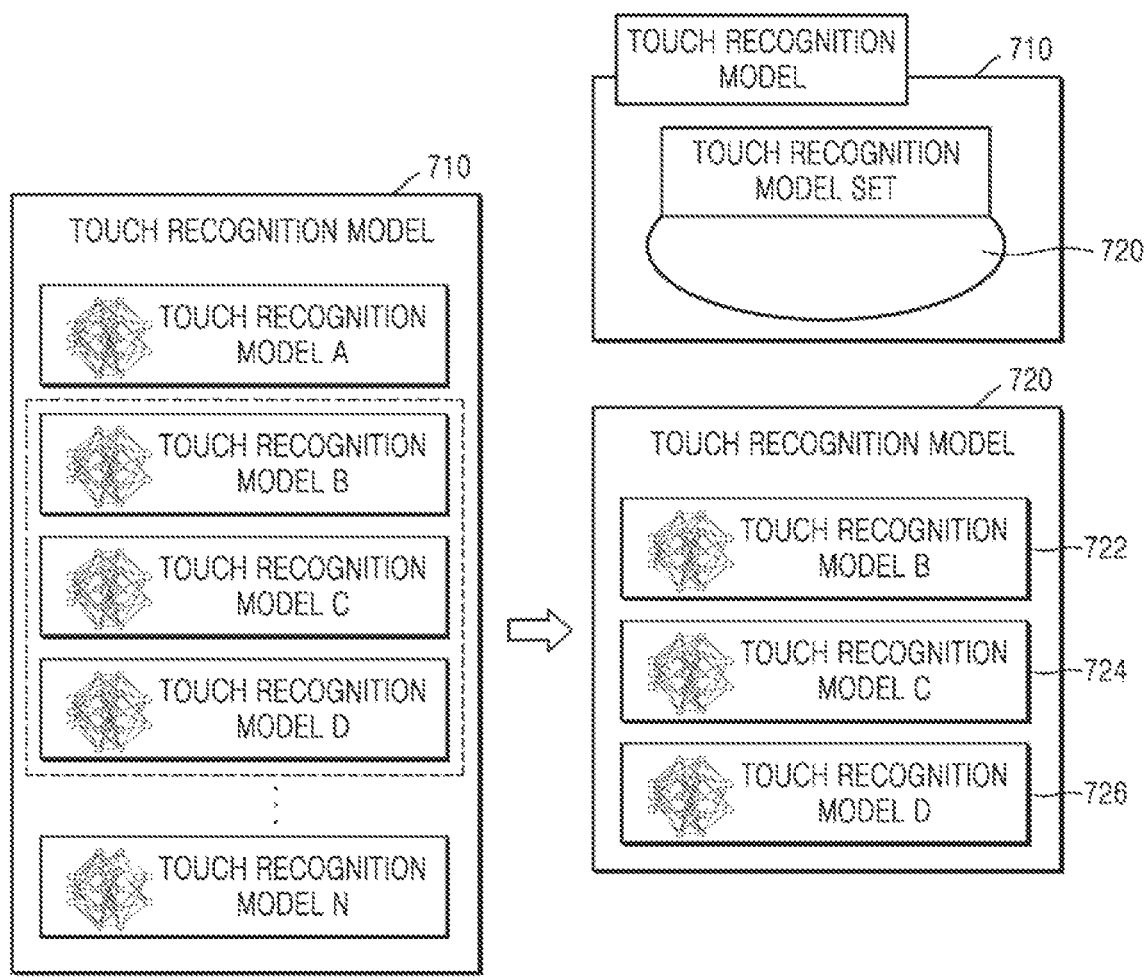
FIG. 7 is a diagram describing a plurality of touch recognition models, and a touch recognition model set determined from among the plurality of touch recognition models, according to an embodiment of the disclosure.

FIG. 7 is a diagram describing a plurality of touch recognition models, and a touch recognition model set determined from among the plurality of touch recognition models.

A plurality of touch recognition models 710, according to an embodiment of the disclosure, include a touch recognition model set 720. In some embodiments, the touch recognition model set 720 is a subset of the plurality of touch recognition models 710, and includes touch recognition models determined used to identify a type of a touch input of a user.

For example, the plurality of touch recognition models 710 may include a touch recognition model A, a touch recognition model B, a touch recognition model C, a touch recognition model D, . . . , and a touch recognition model N. In some embodiments, the touch recognition model A may be an AI model trained based on a touch dataset of a first time period which consists of a plurality of items of touch data corresponding to the first time period. In a similar manner, a touch recognition model N may be an AI model trained based on a touch dataset of an $N^{th}$ time period which consists of a plurality of items of touch data corresponding to the $N^{th}$ time period.

In some embodiments, the plurality of touch recognition models 710 may be trained to identify a touch type of a touch input from touch data obtained from partial time periods respectively corresponding to the plurality of touch recognition models 710.

For example, the touch recognition model A may identify a touch type of a user's touch input from touch data obtained in the first time period, the touch recognition model B may identify a touch type of a user's touch input from touch data obtained in a second time period, and the touch recognition model N may identify a touch type of a user's touch input from touch data obtained in the $N^{th}$ time period.

The touch recognition model set 720, according to an embodiment of the disclosure, may include touch recognition models determined to identify a type of a touch input of a user from among the plurality of touch recognition models 710.

For example, the touch recognition model set 720 configured with respect to a user of the electronic device 2000 may include a touch recognition model B 722, a touch recognition model C 724, and a touch recognition model D 726.

When the electronic device 2000 receives a touch input from the user, the electronic device 2000 may select touch recognition models (e.g., the touch recognition model B 722, the touch recognition model C 724, and the touch recognition model D 726) included in the touch recognition model set 720 from among the plurality of touch recognition models 710, and may identify a touch type of the touch input of the user using the touch recognition model B 722, the touch recognition model C 724, and the touch recognition model D 726 included in the touch recognition model set 720.

A method by which the electronic device 2000, according to an embodiment of the disclosure, sets the touch recognition model set 720 for a user, the touch recognition model set 720 including touch recognition models used to identify a touch type of a touch input of the user, is described in further detail in reference to FIGS. 9 to 10.

Figure 8:
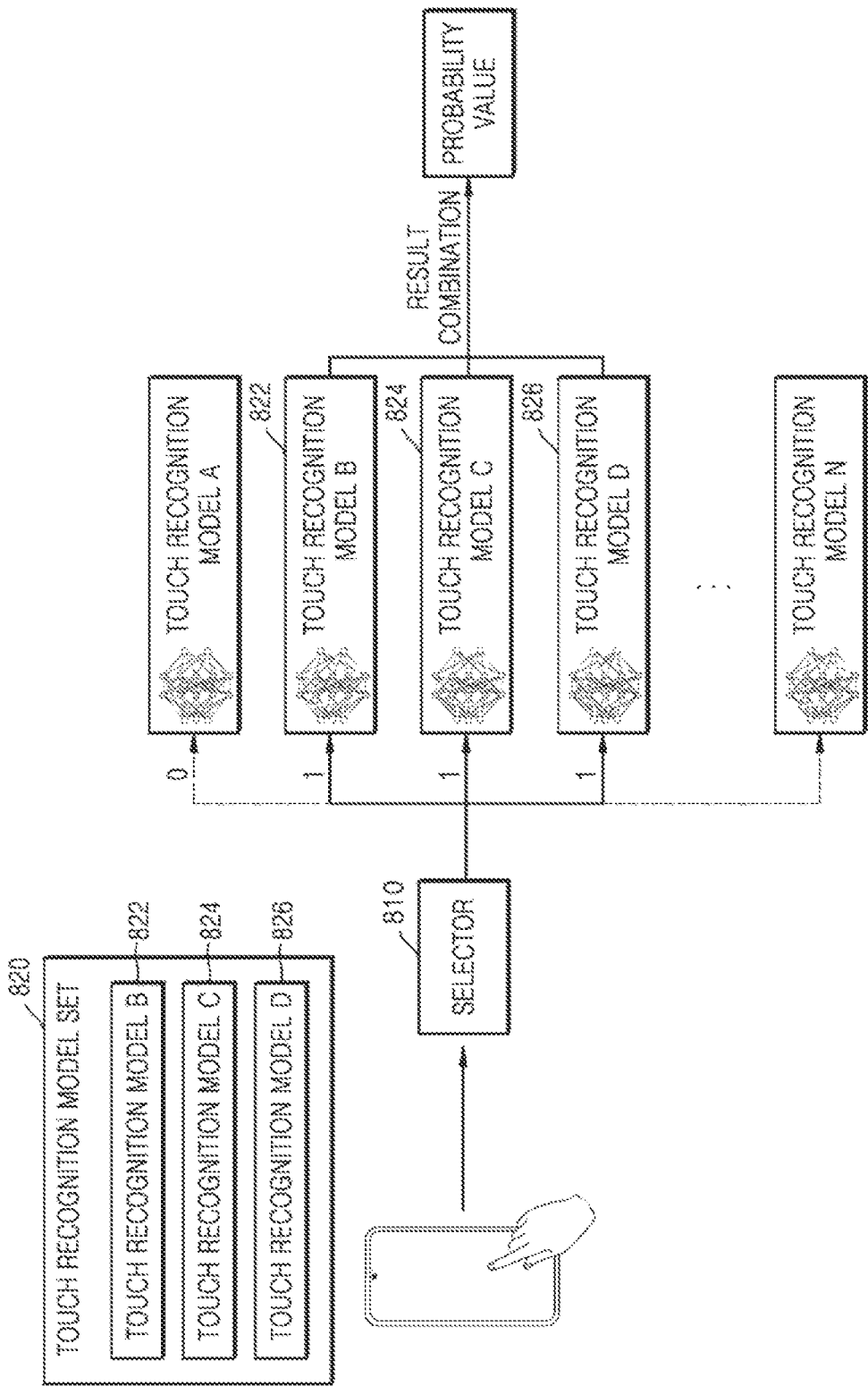
FIG. 8 is a diagram describing a method of identifying a touch type of a touch input of a user by an electronic device using a touch recognition model set configured with respect to the user, according to an embodiment of the disclosure.

FIG. 8 is a diagram describing an example method of identifying a touch type of a touch input of a user by the electronic device 2000 using a touch recognition model set configured with respect to the user, according to an embodiment of the disclosure.

In an embodiment of the disclosure, the electronic device 2000 uses a touch recognition model set 820 configured to identify a touch type of a user based on a feature of a touch input of the user, from among a plurality of touch recognition models stored in the electronic device 2000.

In an embodiment of the disclosure, a feature of a user's touch input may vary with each of the users. Accordingly, determining whether touch data, that is obtained in a touch input of a user and corresponds to a partial time period, is significant, when the electronic device 2000 identifies a touch type of the user, may vary with each of the users. Therefore, the electronic device 2000 may use touch recognition models corresponding to significant partial time periods of touch data, and may not use touch recognition models corresponding to unnecessary time periods.

For example, in a case of the user who performs a fast touch input described above with reference to FIG. 3, as a touch input is fast saturated, a plurality of items of touch data corresponding to partial time periods (i.e., unnecessary time periods), after a preset time starting from a time when a touch of the user who performs a fast touch input, may not be required. Consequently, the electronic device 2000 may not use touch recognition models corresponding to the unnecessary time periods. For example, the electronic device 2000 may use a touch recognition model set 820 consisting of touch recognition models for identifying a touch input of the user, the touch recognition model set 820 excluding the touch recognition models corresponding to the unnecessary time periods.

Referring to FIG. 8, when a touch input of a user is input or received, the electronic device 2000, according to an embodiment of the disclosure, selects touch recognition models included in the touch recognition model set 820 using a selector 810.

In an embodiment of the disclosure, the touch recognition model set 820 selected by the electronic device 2000 using the selector 810 may be preset. For example, the touch recognition model set 820 may be preconfigured with respect to a particular user to include a touch recognition model B 822, a touch recognition model C 824, and a touch recognition model D 826.

When a touch input of the user is input, the electronic device 2000, according to an embodiment of the disclosure, obtains touch data from the touch input, and inputs the obtained touch data into touch recognition models included in the touch recognition model set 820.

For example, the electronic device 2000 may identify, from the touch data obtained from the touch input of the user, touch data of a partial time period corresponding to the touch recognition model B 822, and may input the touch data of the partial time period corresponding to the touch recognition model B 822 into the touch recognition model B 822. Also, the electronic device 2000 may input, from the touch data obtained from the touch input of the user, touch data of a partial time period corresponding to the touch recognition model C 824 into the touch recognition model C 824. In some embodiments, the electronic device 2000 may input, from the touch data obtained from the touch input of the user, touch data of a partial time period corresponding to the touch recognition model D 826 into the touch recognition model D 826.

The electronic device 2000, according to an embodiment of the disclosure, obtains a touch type probability value from each of the touch recognition models included in the touch recognition model set 820, the touch type probability value indicating a result of inference with respect to a type of the touch input of the user.

For example, the electronic device 2000 may output, using the touch recognition model B 822, a probability value indicating a probability that the touch data of the partial time period corresponding to the touch recognition model B 822 is a first type touch. Also, the electronic device 2000 may output, using the touch recognition model C 824, a probability value indicating a probability that the touch data of the partial time period corresponding to the touch recognition model C 824 is a first type touch. In some embodiments, the electronic device 2000 may output, using the touch recognition model D 826, a probability value indicating a probability that the touch data of the partial time period corresponding to the touch recognition model D 826 is a first type touch.

In an embodiment of the disclosure, touch type probabilities respectively output from the touch recognition models included in the touch recognition model set 820 indicate touch types inferred from touch data of partial time periods respectively corresponding to the touch recognition models included in the touch recognition model set 820, in order to finally output a probability of a touch type of the touch input of the user, the electronic device 2000 outputs a final probability value by combining results of the probability values respectively output from the touch recognition models included in the touch recognition model set 820.

In an embodiment of the disclosure, the electronic device 2000 not uses all of a plurality of touch recognition models stored in the electronic device 2000 but uses, using the selector 810, the touch recognition models included in the touch recognition model set 820 configured with respect to the user. As the electronic device 2000 uses, using the selector 810, the touch recognition models included in the touch recognition model set 820, the electronic device 2000 further rapidly identifies a touch type, compared to a case where the touch type is identified using all of the plurality of touch recognition models. Also, as the electronic device 2000 uses, by using the selector 810, the touch recognition models included in the touch recognition model set 820, the electronic device 2000 identifies the touch type with less power consumption, compared to the case where the touch type is identified using all of the plurality of touch recognition models.

With reference to FIG. 9, a method of receiving a sample touch input for configuring the touch recognition model set 820 will now be described, and with reference to FIG. 10, a method of configuring the touch recognition model set 820 based on the sample touch input will be described.

FIG. 9 is a diagram describing a method of receiving a sample touch input from a user and determining a touch recognition model set by the electronic device 2000, according to an embodiment of the disclosure.

The electronic device 2000, according to an embodiment of the disclosure, may obtain sample touch data corresponding to a first type touch and sample touch data corresponding to a second type touch via a user interface that guides the user to input the first type touch and the second type touch.

In an embodiment of the disclosure, the electronic device 2000 may obtain first type sample touch data 915 corresponding to a touch input of a first type via a user interface 910 that guides a sample touch input of a first type. For example, the first type touch may be a force touch.

The electronic device 2000 may obtain first type sample touch data including features (e.g., a time in which a touch input is maintained, an area in which the touch input is received, a change in a touched area, or the like) that occur when the user presses a touchscreen in order to input a force touch, for example.

The electronic device 2000 may obtain the first type sample touch data 915 corresponding to a plurality of force touch inputs by guiding the user with a force touch input such as "Please strongly press a circle part". That is, the electronic device 2000 may output on the output interface 2300 (e.g., display 2310) an indication to the user to input a force touch.

In an embodiment of the disclosure, the electronic device 2000 may obtain second type sample touch data 925 corresponding to a touch input of a second type via a user interface 920 that guides a sample touch input of a second type. For example, the second type touch may be a long touch.

The electronic device 2000 may obtain second type sample touch data including features (e.g., a time in which a touch input is maintained, an area in which the touch input is received, a change in a touched area, or the like) that occur when the user presses the touchscreen in order to input a long touch, for example.

The electronic device 2000 may obtain the second type sample touch data 925 corresponding to a plurality of long touch inputs by guiding the user with a long touch input such as "Please press long a circle part". That is, the electronic device 2000 may output on the output interface 2300 (e.g., display 2310) an indication to the user to input a long touch.

In an embodiment of the disclosure, the electronic device 2000 may provide a feedback indicating a sample touch input being detected. For example, the electronic device 2000 may provide the user with the feedback indicating the sample touch input being detected, via an output of an animation effect of changing an area of a touch input with different colors, an animation effect of shining a boundary of an area of a touch input, or the like. Also, when reception of the touch input of the user for the sample touch input is completed, the electronic device 2000 may provide the user with a feedback indicating reception of the sample touch input being completed, via various output means including sound, vibration, a haptic feedback, a display output, or the like.

The electronic device 2000, according to an embodiment of the disclosure, may determine a touch recognition model set based on a plurality of items of sample touch data obtained from the sample touch input of the user. The touch recognition model set may include touch recognition models used to identify a touch type of a touch input of the user from among a plurality of touch recognition models.

The electronic device 2000, according to an embodiment of the disclosure, may update a threshold value for identifying a touch type of the user, based on the sample touch data. These features are described in further detail in reference to FIGS. 20A to 20C.

FIG. 10 is a diagram describing a method of determining a touch recognition model set from among a plurality of touch recognition models by the electronic device 2000 using touch data obtained from a sample touch input, according to an embodiment of the disclosure.

In an embodiment of the disclosure, sample touch data obtained by the electronic device 2000 may be touch data obtained based on a type of a touch input that the electronic device 2000 guided a user to provide. Consequently, a label value of a touch type which is labeled to each sample touch data may be a true value. That is, a true label value of a touch type of the sample touch data may indicate a touch type to which a user has been guided by the electronic device 2000.

For example, a touch type label value of first type sample touch data 1002 may be touch data obtained by the electronic device 2000 by guiding a user with a first type touch input, and thus, may be a 'first type'. Also, a touch type label value of second type sample touch data 1004 may be touch data obtained by the electronic device 2000 by guiding the user with a second type touch input, and thus, may be a 'second type'.

The electronic device 2000, according to an embodiment of the disclosure, may input the first type sample touch data 1002 and the second type sample touch data 1004, which are obtained from the user, into a plurality of touch recognition models 1010, and thus, may output a probability value indicating a result of inference with respect to the touch type of the sample touch data.

For example, the electronic device 2000 may input the first type sample touch data 1002 into a touch recognition model A 1011, and thus, may obtain sample touch type probability values indicating a result the touch recognition model A 1011 obtains by inferring a touch type of a first type sample touch input. Also, the electronic device 2000 may input the second type sample touch data 1004 into the touch recognition model A 1011, and thus, may obtain sample touch type probability values indicating a result the touch recognition model A 1011 obtains by inferring a touch type of a second type sample touch input. For convenience of description, probability values the electronic device 2000 obtains using the touch recognition model A 1011 are referred to as a probability value A 1012.

In a similar manner, the electronic device 2000 may input each of the first type sample touch data 1002 and the second type sample touch data 1004 into a touch recognition model B 1013, a touch recognition model C 1015, a touch recognition model D 1017, . . . , and a touch recognition model N, and thus, may obtain a probability value B 1014, a probability value C 1016, a probability value D 1018, . . . , and a probability value N which are probability values indicating results of inferences by respective touch recognition models with respect to the touch type of the sample touch input.

The electronic device 2000, according to an embodiment of the disclosure, may calculate accuracy of the inferences with respect to the touch type of the sample touch input by the plurality of touch recognition models 1010, respectively, based on obtained sample touch type probability values and touch types guided to the user by the electronic device 2000.

For example, based on the probability value A 1012 output from the touch recognition model A 1011 and a touch type guided to the user by the electronic device 2000, the electronic device 2000 may calculate accuracy of inference by the touch recognition model A 1011 with respect to the touch type.

For example, an actual touch type label value of the first type sample touch data 1002 may be a 'first type' that is the touch type guided to the user by the electronic device 2000, and the electronic device 2000 may calculate how accurately the touch recognition model A 1011 identifies a touch type of the first type sample touch data 1002 as the 'first type', based on 'first type' that is a true label value indicating an actual touch type of the first type sample touch data 1002.

Also, an actual touch type label value of the second type sample touch data 1004 may be a 'second type' that is the touch type guided to the user by the electronic device 2000, the electronic device 2000 may calculate how accurately the touch recognition model A 1011 identifies a touch type of the second type sample touch data 1004 as the 'second type', based on 'second type' that is a true label value indicating an actual touch type of the second type sample touch data 1004.

In a similar manner, the electronic device 2000 may calculate accuracy of the probability value B 1014 output from the touch recognition model B 1013, accuracy of the probability value C 1016 output from the touch recognition model C 1015, accuracy of the probability value D 1018 output from the touch recognition model D 1017, . . . , and accuracy of the probability value N output from the touch recognition model N.

The electronic device 2000, according to an embodiment of the disclosure, may determine, based on accuracy of the obtained probability values, a touch recognition model set 1020 consisting of touch recognition models used in a case of a touch input by the user.

In an embodiment of the disclosure, the electronic device 2000 may configure, as the touch recognition model set 1020, touch recognition models whose accuracy of calculated probability values from among the touch recognition models 1010 are equal to or greater than a preset reference value.

For example, as a result of calculating, by the electronic device 2000, accuracy of the probability values, the accuracy of the probability value B 1014, the accuracy of the probability value C 1016, and the accuracy of the probability value D 1018 may be equal to or greater than the preset reference value. That is, the electronic device 2000 may determine the touch recognition model set 1020 consisting of the touch recognition model B 1013, the touch recognition model C 1015, and the touch recognition model D 1017.

In another embodiment of the disclosure, the electronic device 2000 may configure, as the touch recognition model set 1020, N touch recognition models whose accuracy of calculated probability values is highest from among the touch recognition models 1010.

For example, as a result of calculating, by the electronic device 2000, accuracy of the probability values, the accuracy of the probability value B 1014, the accuracy of the probability value C 1016, and the accuracy of the probability value D 1018 may be higher than accuracy of remaining probability values. That is, the electronic device 2000 may determine the touch recognition model set 1020 consisting of the touch recognition model B 1013, the touch recognition model C 1015, and the touch recognition model D 1017 which are three touch recognition models whose accuracy of probability values are highest.

The electronic device 2000 may configure touch recognition models whose accuracy is equal to or greater than a preset reference value or N touch recognition models whose accuracy is highest, as the touch recognition model set 1020, and thus, may use only touch recognition models corresponding to significant partial time periods of touch data and may not use touch recognition models corresponding to unnecessary time periods.

That is, the electronic device 2000 may determine the touch recognition model set 1020 according to the aforementioned embodiments of the disclosure, and thus, when a touch input of a user is input, may identify a touch type of the touch input of the user using only touch recognition models included in the touch recognition model set 1020.

Accordingly, as the electronic device 2000 uses the touch recognition models included in the touch recognition model set 1020, the electronic device 2000 may further rapidly identify a touch type, compared to a case where the touch type is identified using all of the plurality of touch recognition models. Also, as the electronic device 2000 uses the touch recognition models included in the touch recognition model set 1020, the electronic device 2000 may identify the touch type with less power consumption, compared to the case where the touch type is identified using all of the plurality of touch recognition models.

Figure 11:
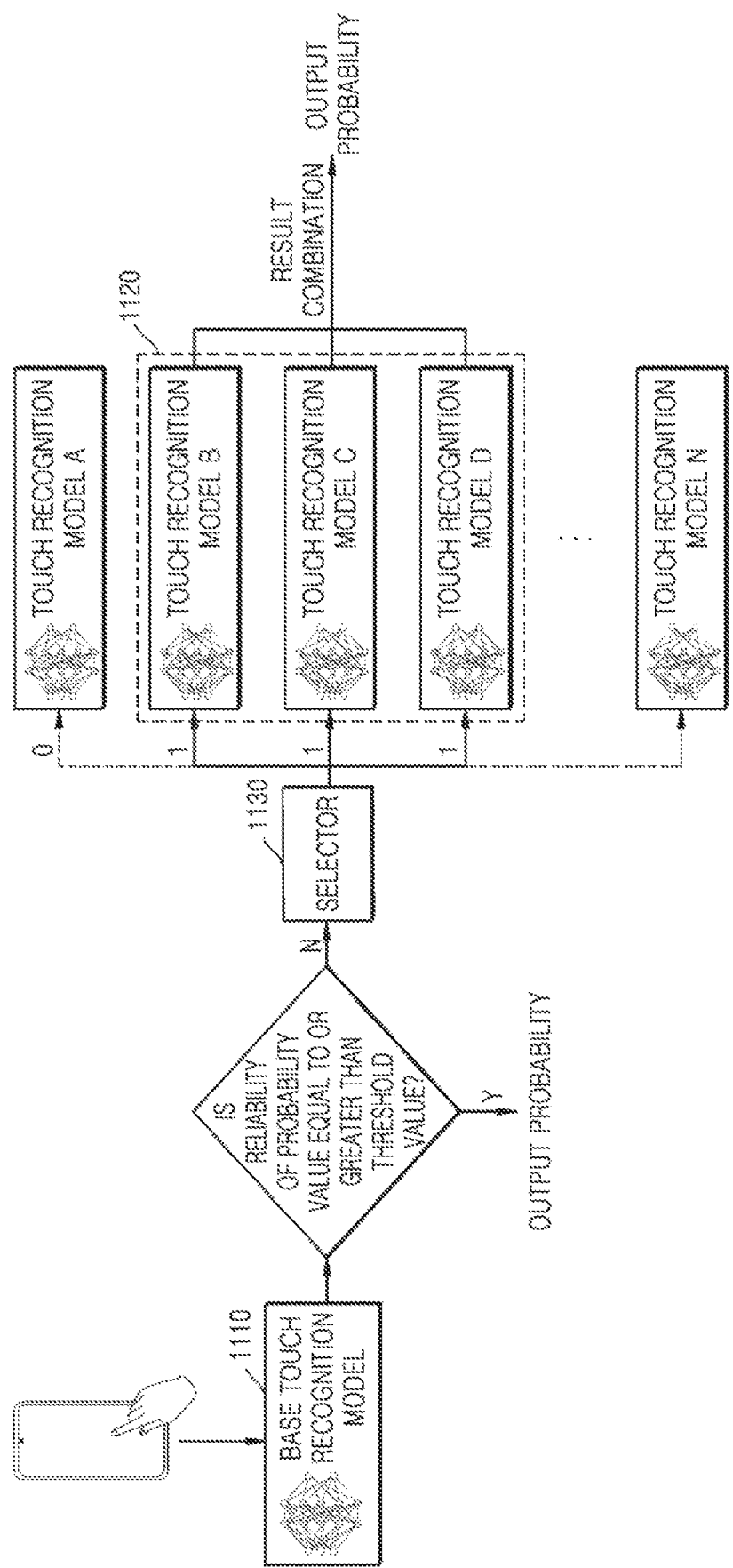
FIG. 11 is a diagram describing an example method, performed by an electronic device when the electronic device identifies a touch type of a touch input of a user using touch recognition models preconfigured with respect to the user, of identifying the touch type further using a base touch recognition model, according to an embodiment of the disclosure.

FIG. 11 is a diagram describing a method, performed by the electronic device 2000 when the electronic device identifying a touch type of a touch input of a user using touch recognition models preconfigured with respect to the user, of identifying the touch type further using a base touch recognition model, according to an embodiment of the disclosure.

The electronic device 2000, according to an embodiment of the disclosure, outputs a touch type probability by applying, to a base touch recognition model 1110, touch data obtained from a user. For example, the base touch recognition model 1110 may be a general-use AI model trained to identify a touch type of a touch input of a random user.

The electronic device 2000 applies touch data to the base touch recognition model 1110, and thus, determines whether to identify a type of a touch input of a user using touch recognition models included in a touch recognition model set 1120.

In an embodiment of the disclosure, the electronic device 2000 outputs, using the base touch recognition model 1110, a probability value indicating whether a touch type of the touch input of the user is a first type touch input. For example, the electronic device 2000 may output, using the base touch recognition model 1110, a probability value indicating that a probability of the touch input of the user is a first type touch is 0.9. In another example, the electronic device 2000 may output, using the base touch recognition model 1110, a probability value indicating that a probability of the touch input of the user is a first type touch is 0.6.

The electronic device 2000, according to an embodiment of the disclosure, determines whether to identify a touch type of the touch input of the user using the touch recognition model set 1120, based on reliability of a probability value output from the base touch recognition model 1110.

In an embodiment of the disclosure, reliability of a probability value indicates whether it is possible to determine a touch type of a touch input of a user, based on the probability value output from the base touch recognition model 1110.

For example, a threshold value for the base touch recognition model 1110 to identify whether the touch type of the touch input of the user is a first type touch input may be '0.5'. That is, when a probability that the touch input of the user is a first type touch is equal to or greater than the threshold value of 0.5, the base touch recognition model 1110 may identify a type of the touch input of the user as the first type touch, and when a probability that the touch input of the user is the first type touch is less than the threshold value of 0.5, the base touch recognition model 1110 may identify a type of the touch input of the user as a second type. Therefore, when a probability of being the first type touch output from the base touch recognition model 1110 is 0.6 being greater than the threshold value, the base touch recognition model 1110 identifies the touch input of the user as the first type touch, but reliability of a probability value of this case may be low. In an embodiment of the disclosure, the electronic device 2000 may update the threshold value for identifying a touch type. These features are described in further detail in reference to FIG. 20.

The electronic device 2000, according to an embodiment of the disclosure, determines whether to identify a touch type of a touch input of a user using the touch recognition model set 1120, based on a threshold value with respect to reliability of a probability value.

For example, when it is determined that a probability value output from the base touch recognition model 1110 is equal to or greater than a threshold value, and thus, a touch input identification result from the base touch recognition model 1110 is reliable, the electronic device 2000 may output a probability that a touch input of a user is a first touch type. The electronic device 2000 may determine, based on the output probability value, whether a touch type of the touch input of the user is a first type touch input.

Alternatively or additionally, when it is determined that a probability value output from the base touch recognition model 1110 is smaller than the threshold value, and thus, a touch input identification result from the base touch recognition model 1110 is not reliable, the electronic device 2000 selects touch recognition models to be included in the touch recognition model set 1120 to identify a touch type of the touch input of the user. For example, the electronic device 2000 may select the touch recognition model set 1120 using a selector 1130. The touch recognition model set 1120 the electronic device 2000 selects using the selector 1130 may have been pre-selected with respect to the user. This has been described in reference to FIGS. 8 and 9, and thus, same descriptions are not provided here.

The electronic device 2000, according to an embodiment of the disclosure, may select a plurality of the touch recognition model sets 1120 using the selector 1130, and may input touch data into the plurality of the selected touch recognition model sets 1120.

For example, the electronic device 2000 may identify touch data of a partial time period corresponding to a touch recognition model B from among touch data obtained from the touch input of the user, and may input the touch data of the partial time period corresponding to the touch recognition model B into the touch recognition model B. Also, the electronic device 2000 may input touch data of a partial time period corresponding to a touch recognition model C into the touch recognition model C, the touch data being from among the touch data obtained from the touch input of the user. Also, the electronic device 2000 may input touch data of a partial time period corresponding to a touch recognition model D into the touch recognition model D, the touch data being from among the touch data obtained from the touch input of the user.

The electronic device 2000. according to an embodiment of the disclosure. may obtain a touch type probability value indicating a result of inference with respect to a type of the touch input of the user from each of touch recognition models included in the plurality of touch recognition model sets 1120.

The electronic device 2000, according to an embodiment of the disclosure, may combine probability values respectively output from the touch recognition models included in the touch recognition model set 1120, and thus, may output a final probability value indicating a probability value of the touch input of the user being the first type touch.

Figure 12:
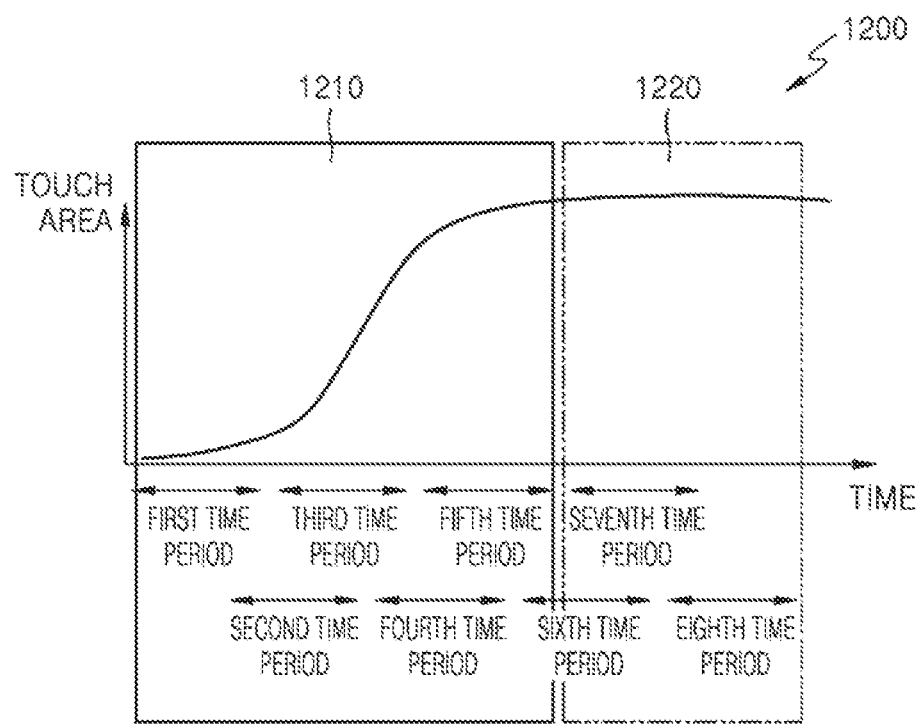
FIG. 12 is a diagram describing a primary time period of a touch input of a user which is input to an electronic device, according to an embodiment of the disclosure.

FIG. 12 is a diagram describing a primary time period of a touch input of a user which is input to the electronic device 2000, according to an embodiment of the disclosure.

FIG. 12 illustrates a touch area-time graph 1210 that is a graph of touch data obtained from a touch input of a user which is input to the electronic device 2000. The Y-axis of the graph indicates an area in which the obtained touch input is received, and the X-axis of the graph indicates a time in which the touch input is received.

The electronic device 2000, according to an embodiment of the disclosure, identifies a primary time period that is a partial time period in which a feature of a touch input of a user is shown from among a time in which the touch input of the user is maintained. For example, the electronic device 2000 may obtain touch type probability values from a plurality of touch recognition models corresponding to a plurality of partial time periods included in the time in which the touch input is maintained. That is, the plurality of touch recognition models may each be an AI model that outputs a probability value indicating a probability that a touch type of the touch input of the user is a first type touch (e.g., a force touch).

For example, the electronic device 2000 may obtain, using a touch recognition model A, a touch type probability value (e.g., probability value A) from touch data obtained from a first time period, may obtain, using a touch recognition model B, a touch type probability value (e.g., probability value B) from touch data obtained from a second time period, and may obtain, in a similar manner, touch type probability values respectively from a plurality of items of touch data obtained from a third time period to an eighth time period.

The electronic device 2000, according to an embodiment of the disclosure, identifies a primary time period, based on the obtained probability values.

For example, as a result of identifying, by the electronic device 2000, the probability values, probability values output from touch recognition models corresponding to first to fifth time periods 1210 may be greater than probability values output from touch recognition models corresponding to sixth to eighth time periods 1220. That is, the electronic device 2000 may determine that a user applied a force to the electronic device 2000 in order to apply a force touch input in the first to fifth time periods 1210 that are partial time periods in which the probability values are greater. The electronic device 2000 may generate pattern information of a user applying a force to the electronic device 2000, based on touch type probability values output from touch recognition models. In an embodiment of the disclosure, the electronic device 2000 may generate pattern information indicating that, in a touch input pattern of the user, a force is applied to the electronic device 2000 in a time band included in the first to fifth time periods 1210.

The electronic device 2000 identifies, based on the pattern information, a primary time period determined as a period in which the user applies a force to the electronic device 2000. For example, as the touch input pattern of the user in the aforementioned example is identified as a touch input pattern in which a force is applied in the first to fifth time periods 1210, the electronic device 2000 may identify the first to fifth time periods 1210 as a primary time period.

The electronic device 2000 may identify a touch type of the touch input of the user using a touch recognition model corresponding to partial time periods identified as the primary time period. For example, an electronic device may identify a touch type of a touch input of a user using touch recognition model A to touch recognition model E that are touch recognition models corresponding to first to fifth time periods. That is, the touch recognition model A to the touch recognition model E may be included in a touch recognition model set according to the aforementioned embodiments of the disclosure.

With respect to identified primary time periods, the electronic device 2000 may apply a weight to a probability value being output from a touch recognition model corresponding to a primary time period. These features are described in further detail in reference to FIG. 13.

Figure 13:
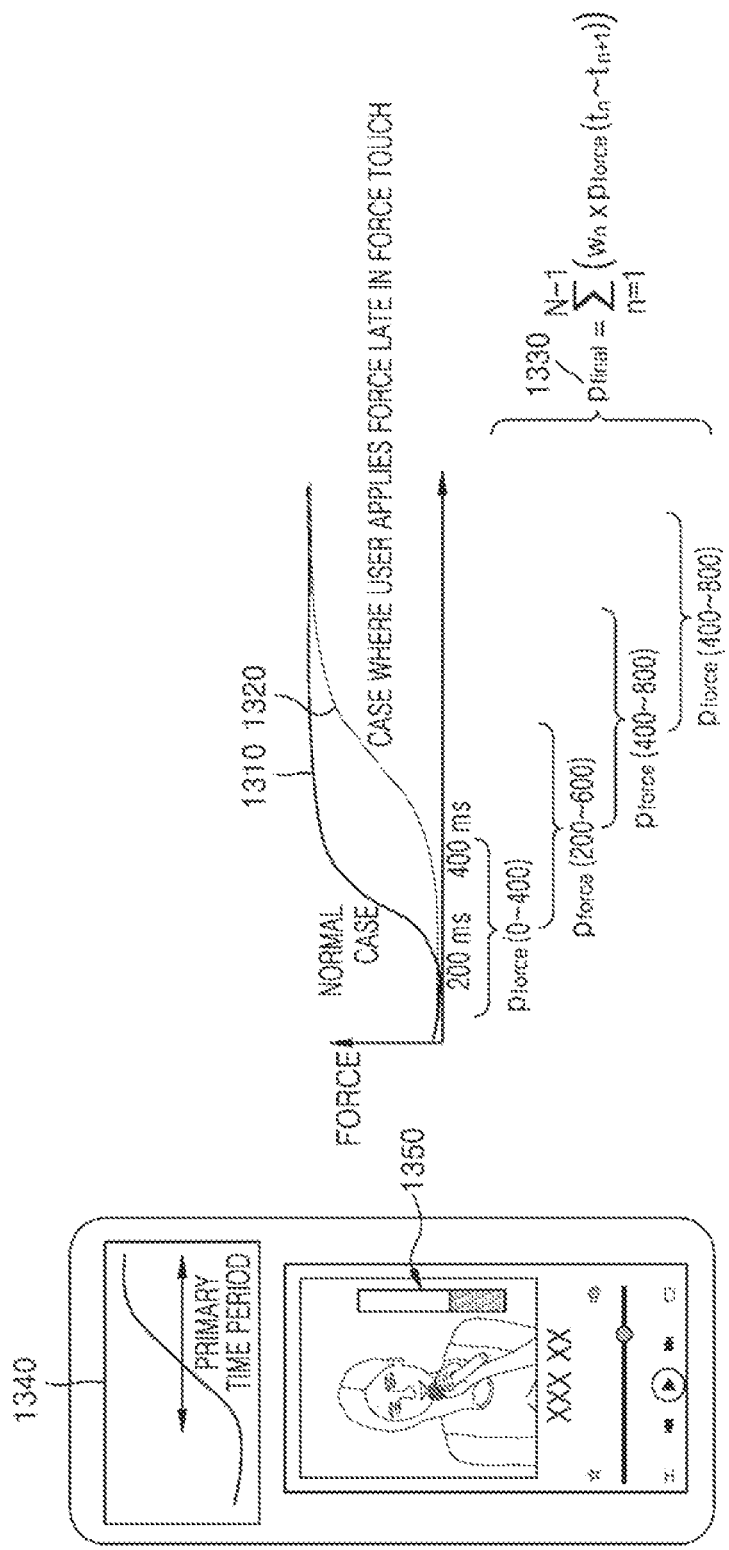
FIG. 13 is a diagram describing a method of combining, by an electronic device, touch type probability values obtained from touch recognition models included in a touch recognition model set, by applying a weight to a primary time period, according to an embodiment of the disclosure.

FIG. 13 is a diagram describing a method of combining, by the electronic device 2000, touch type probability values obtained from touch recognition models included in a touch recognition model set, by applying a weight to a primary time period, according to an embodiment of the disclosure.

The electronic device 2000, according to an embodiment of the disclosure, generates pattern information of a user applying a force to the electronic device 2000, and may calculate a primary time period, based on touch type probability values obtained from a plurality of touch recognition models. As these features are described in reference to FIG. 12, descriptions thereof are not provided here.

For example, in a case of a first user, the first user may be a user who applies, in a touch input, a force in a time band of 0 ms to 600 ms, according to a first curve 1310 that is a curve indicating a force touch input of the first user (e.g., a normal case). That is, a touch input pattern of the first user applying a force in a force touch is a touch input pattern in which a force is applied in a first time period (e.g., [0 ms, 400 ms]) and a second time period (e.g., [200 ms, 600 ms]), and thus, the electronic device 2000 may identify a primary time period with respect to the first user as the first time period and the second time period.

The electronic device 2000 may apply a weight to the first time period and the second time period which are the primary time period identified with respect to the first user. The electronic device 2000 may obtain a final probability value by combining touch type probability values obtained from the touch recognition models. For example, the electronic device 2000 may multiply a weight by a probability value $P_{force(0-400)}$ output from a touch recognition model corresponding to the first time period and a probability value $P_{force(200-600)}$ output from a touch recognition model corresponding to the second time period, and may obtain a final probability value $P_{final}$ by summing probability values to which the weight is multiplied.

In another embodiment, in a case of a second user who is a different user, the second user may be a user who applies, in a touch input, a force in a time band of 400 ms to 800 ms, according to a second curve 1320 that is a curve indicating a force touch input of the second user (e.g., a case in which a user applies a force late in a touch input). For example, a touch input pattern of the second user applying a force in a force touch is a touch input pattern in which a force is applied in a second time period (e.g., [200 ms, 600 ms]) and a third time period (e.g., [400 ms, 800 ms]), and thus, the electronic device 2000 may identify a primary time period with respect to the second user as the second time period and the third time period.

The electronic device 2000 may apply a weight to the second time period and the third time period which are the primary time period identified with respect to the second user. The electronic device 2000 may obtain a final probability value by combining touch type probability values obtained from touch recognition models. For example, the electronic device 2000 may multiply a weight by a probability value $P_{force(200-600)}$ output from a touch recognition model corresponding to the second time period and a probability value $P_{force(400-900)}$ output from a touch recognition model corresponding to the third time period, and may obtain a final probability value $P_{final}$ 1330 by summing probability values to which the weight is multiplied.

That is, the electronic device 2000 may obtain the final probability value $P_{final}$ 1330 by combining the probability values output from touch recognition models corresponding to a primary time period by applying a weight to the primary time period, as shown in Equation 1 below.

$$P_{final} = \sum_{n=1}^{N-1} (w_n \times p_{force}(t_n \sim t_{n+1}))$$ [Eq. 1]

where, $P_{final}$ may indicate a probability of a user's touch input being a force touch that is a first type touch, $w_n$ may indicate a weight in an $n^{th}$ time period, and $p_{force}(t_n \sim t_{n+1})$ may indicate a probability value output from a touch recognition model corresponding to the $n^{th}$ time period.

Also, in order to make a user recognize that the user is applying a force touch, the electronic device 2000, according to an embodiment of the disclosure, may visually provide the user with a change in a force being applied by the user when the force touch is input. For example, the electronic device 2000 may visualize and display the force being applied according to time in a touch input by the user, using at least a part 1340 of a display of the electronic device 2000. Referring to FIG. 13, in an example, the electronic device 2000 visualizes, in the form of a graph, a change in a force being applied in a force touch input by the user and provides the user with the graph, but the disclosure is not limited thereto, and various method of visually providing a change in a force to a user may be used.

Also, the electronic device 2000 may provide a user with a user interface via which the user can perform an operation corresponding to a touch type input by the user, based on a result of identifying the touch type of the user. For example, when a touch input of a user is identified as a force touch that is a first type touch, the electronic device 2000 may display a volume adjustment user interface 1350 for performing a volume adjustment operation that is an operation preset to correspond to the force touch.

Figure 14:
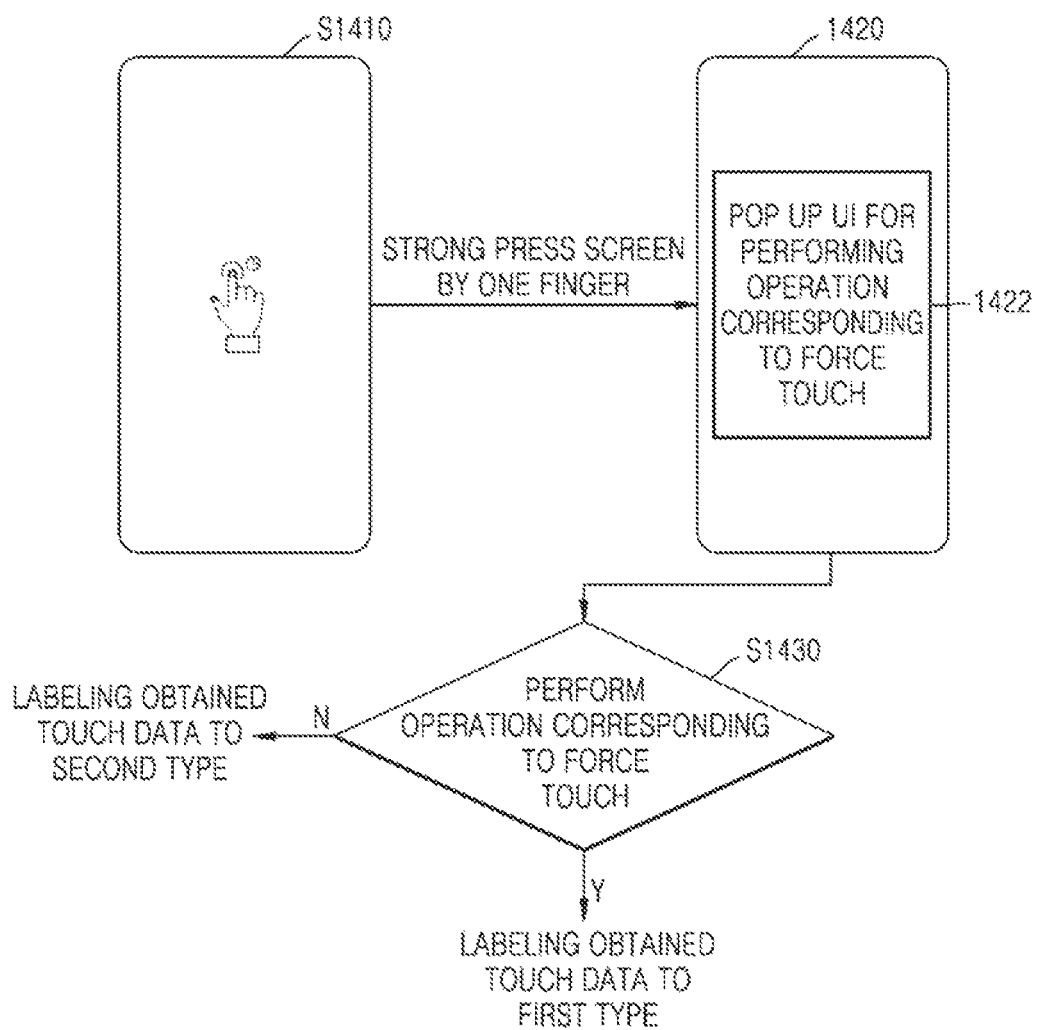
FIG. 14 is a diagram describing a method of labeling, by an electronic device, a touch type to touch data and generating training touch data, according to an embodiment of the disclosure.

FIG. 14 is a diagram describing a method of labeling, by the electronic device 2000, a touch type to touch data in order to generate training touch data, according to an embodiment of the disclosure.

The electronic device 2000, according to an embodiment of the disclosure, obtains a plurality of items of real-use touch data from real-use touch inputs being input as a user actually uses the electronic device 2000. In order to update touch recognition models using the plurality of items of obtained real-use touch data, the electronic device 2000 labels a label value indicating a touch type to the plurality of items of obtained real-use touch data, and thus, generates training touch data.

In operation S1410, the electronic device 2000 receives a touch input from a user. For example, the electronic device 2000 may identify a touch type of the touch input of the user, and may display a user interface for performing an operation corresponding to the touch type input by the user.

For example, in a case where the user performs a touch input of pressing a screen of the electronic device 2000 using a finger, the electronic device 2000 may identify that the touch input of the user is a force touch that is a first type. Also, an operation corresponding to the force touch when the force touch is input to the electronic device 2000 may be preset in the electronic device 2000.

In operation S1420, the electronic device 2000 displays a user interface 1422 for performing an operation corresponding to the force touch.

For example, when a force touch is input to the electronic device 2000, a preset operation corresponding to the force touch may be a 'volume adjustment' operation. In order to perform the 'volume adjustment' operation, the electronic device 2000 may display a volume adjustment interface via which volume adjustment of the electronic device 2000 is available.

In operation S1430, the electronic device 2000 determines which label value is used to label touch data obtained from the touch input of the user which is input in operation S1410.

For example, a touch intention of the user who did the touch input of pressing the screen using the finger in operation S1410 may have been a touch intention of pressing a force touch. That is, as the user interface 1422 for performing an operation corresponding to the force touch is displayed, the user may input a user input for performing the operation corresponding to the force touch. In detail, as the volume adjustment interface is displayed, the user may perform volume adjustment. When the user performs volume adjustment, the electronic device 2000 may determine the touch intention of the user as the force touch, and thus, may label real-use touch data obtained in operation S1410 to a first type. In some embodiments, the first type may be a force touch type.

In another embodiment, a touch intention of the user who did the touch input of pressing the screen using the finger in operation S1410 may have been a touch intention of pressing a different touch (e.g., long touch). For example, even when the user interface 1422 for performing an operation corresponding to the force touch is displayed, the user may not input a user input for performing the operation corresponding to the force touch. In detail, even when the volume adjustment interface is displayed, the user may not perform volume adjustment. In a case where the user does not perform volume adjustment, the electronic device 2000 may determine the touch intention of the user is not the force touch, and thus, may label real-use touch data obtained in operation S1410 to a second type. In some embodiments, the second type may be a long touch type.

The electronic device 2000 may generate training touch data by labeling a label value indicating a touch type to a plurality of items of touch data obtained as the user actually uses the electronic device 2000, and may update touch recognition models using the generated training touch data.

Figure 15:
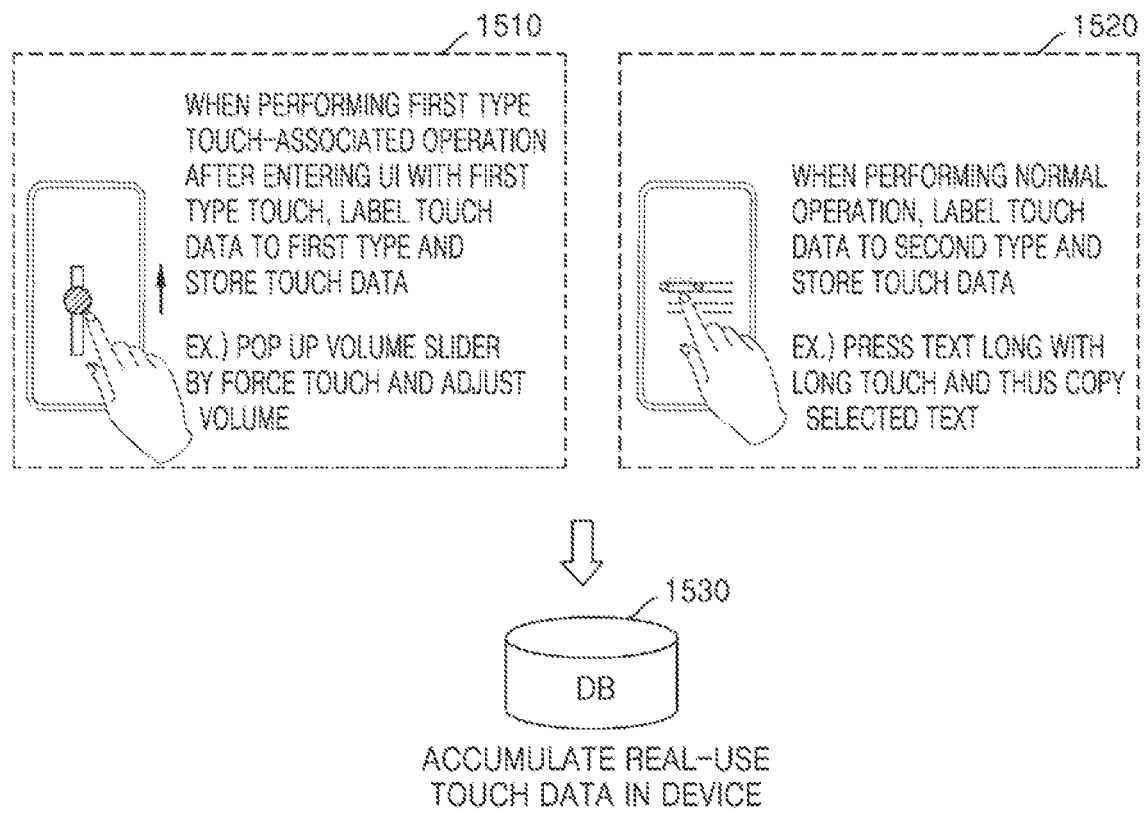
FIG. 15 is a diagram further describing a method of labeling, by an electronic device, a touch type to touch data and generating training touch data, according to an embodiment of the disclosure.

FIG. 15 is a diagram further describing a method of labeling, by the electronic device 2000, a touch type to touch data and generating training touch data, according to an embodiment of the disclosure.

The electronic device 2000 generates training touch data by labeling a touch type to a plurality of items of real-use touch data obtained as a user actually uses the electronic device 2000, and stores a plurality of items of training touch data in a database 1530 in the electronic device 2000.

A case in which the electronic device 2000 labels and stores touch data as a first type will be described, referring to a block 1510 of FIG. 15. The electronic device 2000, according to an embodiment of the disclosure, identifies a touch type of a touch input of a user, based on touch data of the user. When it is identified that the user has input a first type touch, the electronic device 2000 may display a preset user interface corresponding to the first type touch. When the user performs an operation associated with the first type touch, the electronic device 2000 may store, in the database 1530, training touch data that is real-use touch data being labeled to a first type. For example, when the user inputs a force touch, a volume adjustment interface being an operation associated with the force touch is displayed, and the user performs a volume adjustment operation, the electronic device 2000 may label touch data corresponding to the force touch of the user to the first type and may store the touch data in the database 1530.

A case in which the electronic device 2000 labels and stores touch data as a second type will be described, referring to a block 1520 of FIG. 15. The electronic device 2000, according to an embodiment of the disclosure, identifies a touch type of a touch input of a user, based on touch data of the user. When it is identified that the user has input a second type touch, the electronic device 2000 may not display the preset user interface corresponding to the first type touch. When the user inputs the second type touch and performs a normal operation according to the second type touch, the electronic device 2000 may store, in the database 1530, training touch data in which real-use touch data is labeled to a second type. For example, when the user inputs a long touch, selects a text displayed on a screen by inputting drag after the long touch, and then performs an operation of copying the selected text, the electronic device 2000 may label touch data corresponding to the long touch of the user to the second type and may store the touch data in the database 1530.

Figure 16:
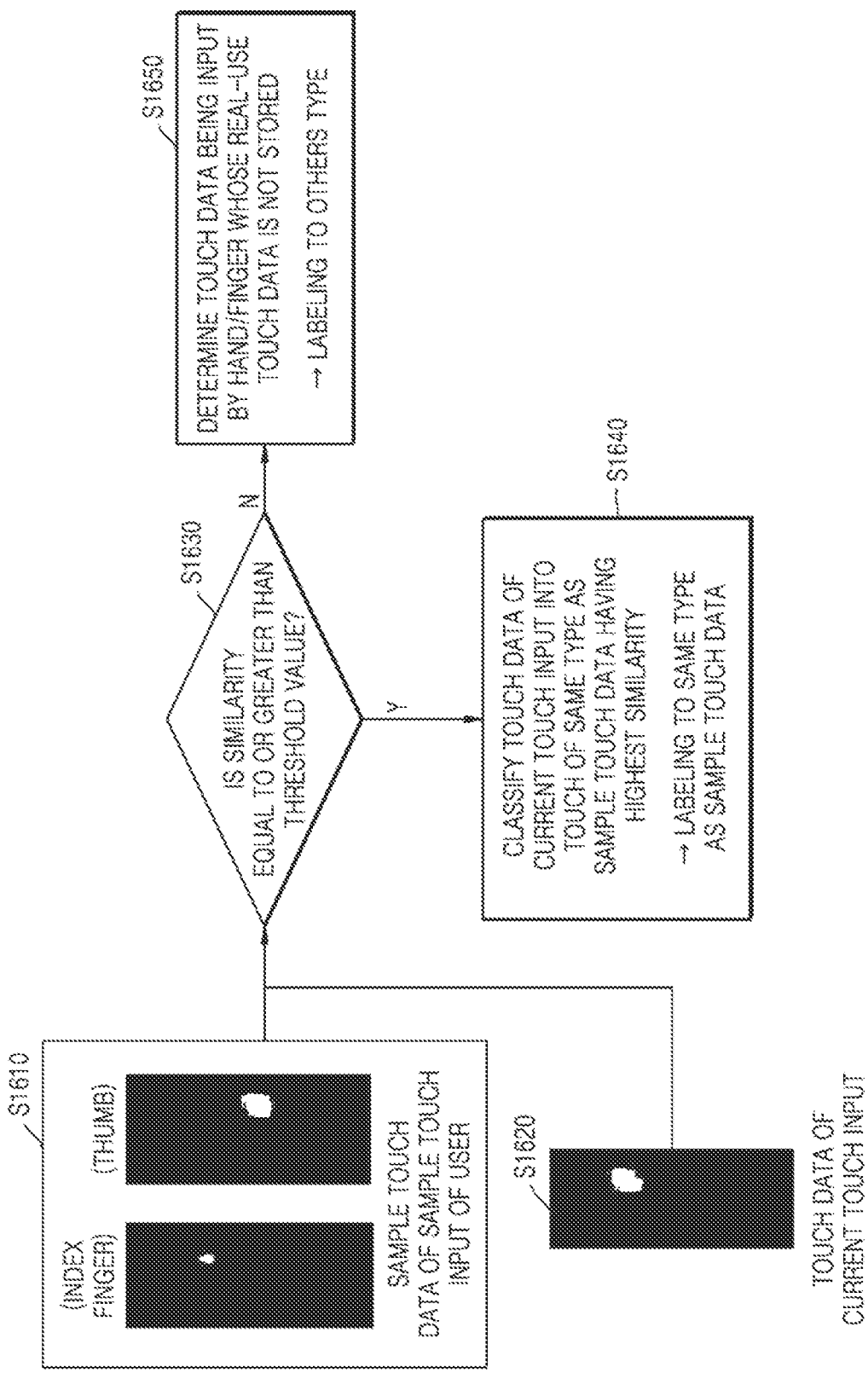
FIG. 16 is a diagram describing another method of labeling, by an electronic device, a touch type to touch data and generating training touch data, according to an embodiment of the disclosure.

FIG. 16 is a diagram describing another method of labeling, by the electronic device 2000, a touch type to touch data and generating training touch data, according to an embodiment of the disclosure.

The electronic device 2000, according to an embodiment of the disclosure, compares sample touch data with real-use touch data obtained as a user actually uses the electronic device 2000, and thus, labels a label value indicating a touch type to the real-use touch data. For example, the sample touch data may be touch data obtained by guiding, by the electronic device 200, a particular type of a touch input to the user. The method, performed by the electronic device 2000, of obtaining sample touch data is already described in reference to FIG. 9, and thus, same descriptions are not provided here.

In operation S1610, the electronic device 2000, according to an embodiment of the disclosure, obtains sample touch data of a user. When sample touch data of the user is stored in the electronic device 2000, the electronic device 2000 may obtain the stored sample touch data. When sample touch data of the user is not stored in the electronic device 2000, the electronic device 2000 may guide the user with a sample touch input, and thus, may obtain sample touch data.

In operation S1620, the electronic device 2000, according to an embodiment of the disclosure, obtains touch data of a real-use touch input of the user.

In operation S1630, the electronic device 2000, according to an embodiment of the disclosure, compares a similarity between the sample touch data of the sample touch input of the user and real-use touch data of the real-use touch input. In an embodiment of the disclosure, the electronic device 2000 determines the similarity between the real-use touch data and the sample touch data by comparing touch areas of touch data.

For example, when a difference between a touch area of the sample touch data and a touch area of the real-use touch data is less than a threshold value, the electronic device 2000 may determine that the real-use touch data and the sample touch data are similar. When it is determined that the real-use touch data and the sample touch data are similar, the electronic device 2000 may perform operation S1640.

In another example, when the difference between the touch area of the sample touch data and the touch area of the real-use touch data is equal to or greater than the threshold value, the electronic device 2000 may determine that the real-use touch data and the sample touch data are not similar. When it is determined that the real-use touch data and the sample touch data are not similar, the electronic device 2000 may perform operation S1650.

In operation S1640, the electronic device 2000, according to an embodiment of the disclosure, labels the real-use touch data to a same label value as a touch type of the sample touch data. The electronic device 2000 may identify sample touch data having a highest similarity to real-use touch data of a current touch input, based on a result of comparing real-use touch data with a plurality of items of sample touch data. The electronic device 2000 may label the real-use touch data to a label value of a same touch type of the sample touch data having the highest similarity. For example, the touch type of the sample touch data indicates a touch type guided to the user by the electronic device 2000.

For example, when the touch type of the sample touch data having the highest similarity to the real-use touch data is a first type, the electronic device 2000 may label a label value of the real-use touch data to the first type. In another example, when the touch type of the sample touch data having the highest similarity to the real-use touch data is a second type, the electronic device 2000 may label a label value of the real-use touch data to the second type.

In operation S1650, the electronic device 2000, according to an embodiment of the disclosure, labels the real-use touch data to a third label value different from a touch type of the sample touch data. When it is determined that real-use touch data has a low similarity to the plurality of items of sample touch data, the electronic device 2000 may determine that the real-use touch data is touch data being input by a finger which is not stored in the electronic device 2000. For example, the electronic device 2000 may not determine a touch type of the input real-use touch data, and thus, may label the real-use touch data to a label value of other types.

Figure 17:
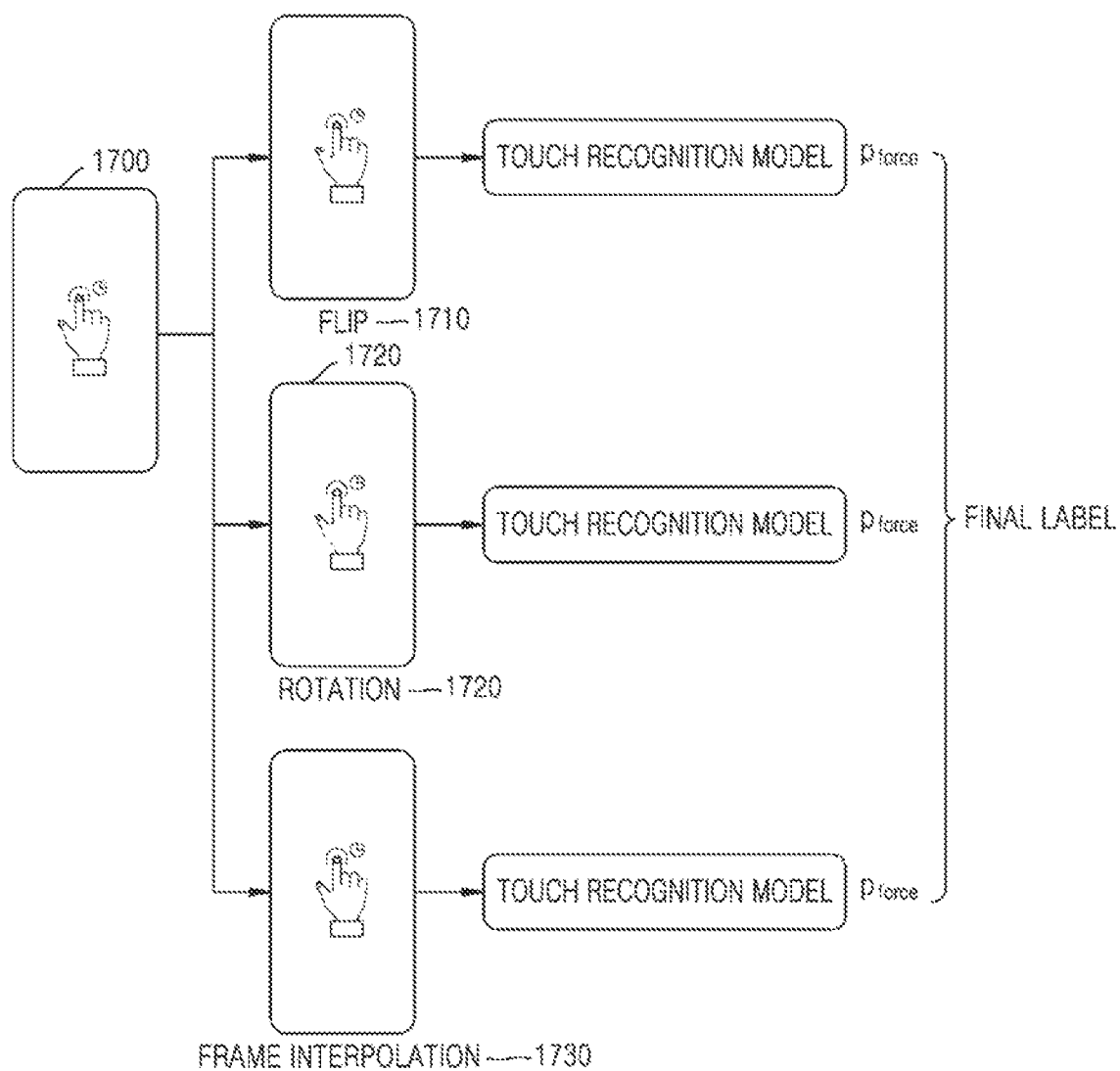
FIG. 17 is a diagram describing a method of evaluating reliability of labeled training touch data by an electronic device, according to an embodiment of the disclosure.

FIG. 17 is a diagram describing a method of evaluating reliability of labeled training touch data by the electronic device 2000, according to an embodiment of the disclosure.

The electronic device 2000, according to an embodiment of the disclosure, evaluates reliability of training touch data 1700 generated by labeling a label value to real-use touch data. The electronic device 2000 performs a preset data augmentation task to the training touch data 1700, and obtains a touch type probability value by applying augmented training touch data to a touch recognition model. The electronic device 2000 determines a final label value of the training touch data 1700, based on the obtained touch type probability value.

In an embodiment of the disclosure, a data augmentation scheme being applied to the training touch data 1700 may be a flip. For example, the flip may indicate a data augmentation scheme of obtaining data by performing left-and-right reversal, up-and-down reversal, up and down-right and left reversal, and the like on an image frame obtained as touch data. The electronic device 2000 may flip a plurality of items of the training touch data 1700 and may obtain a plurality of items of flipped touch data 1710. The electronic device 2000 may apply the flipped touch data 1710 to a touch recognition model, and thus, may output a touch type probability value. The electronic device 2000 may identify a touch type corresponding to the flipped touch data 1710, based on the touch type probability value output from the flipped touch data 1710. For example, the electronic device 2000 may identify the touch type of the flipped touch data 1710, based on a preset threshold value and a touch type probability of the flipped touch data 1710. The electronic device 2000 may compare the identified touch type of the flipped touch data 1710 with a touch type of the training touch data 1700, and may determine whether the touch type of the flipped touch data 1710 is equal to the touch type of the training touch data 1700. When it is determined that the touch type of the flipped touch data 1710 is equal to the touch type of the training touch data 1700, the electronic device 2000 may determine a label value labeled to the training touch data 1700 to be reliable. Therefore, the electronic device 2000 may finalize the label value of the training touch data 1700, and thus, may determine a final label value of the training touch data 1700.

In an embodiment of the disclosure, the data augmentation scheme being applied to the training touch data 1700 may be rotation. The electronic device 2000 may rotate the plurality of items of training touch data 1700, and thus, may obtain a plurality of items of rotated touch data 1720. The electronic device 2000 may apply the rotated touch data 1720 to a touch recognition model, and thus, may output a touch type probability value. The electronic device 2000 may identify a touch type corresponding to the rotated touch data 1720, based on the touch type probability value output from the rotated touch data 1720. For example, the electronic device 2000 may identify the touch type of the rotated touch data 1720, based on a preset threshold value and a touch type probability of the rotated touch data 1720. The electronic device 2000 may compare the identified touch type of the rotated touch data 1720 with a touch type of the training touch data 1700, and may determine whether the touch type of the rotated touch data 1720 is equal to the touch type of the training touch data 1700. When it is determined that the touch type of the rotated touch data 1720 is equal to the touch type of the training touch data 1700, the electronic device 2000 may determine a label value labeled to the training touch data 1700 to be reliable. Therefore, the electronic device 2000 may finalize the label value of the training touch data 1700, and thus, may determine a final label value of the training touch data 1700.

In an embodiment of the disclosure, the data augmentation scheme being applied to the training touch data 1700 may be frame interpolation. For example, the frame interpolation may indicate a data augmentation scheme of obtaining data by generating an interpolated frame by interpolating a gap between image frames obtained as touch data. The electronic device 2000 may perform the frame interpolation on at least some of the plurality of items of training touch data 1700, and thus, may obtain a plurality of items of interpolated touch data 1730. The method by which the electronic device 2000 augments the training touch data 1700 using the frame interpolation, and evaluates reliability will be further described with reference to FIG. 18.

Figure 18:
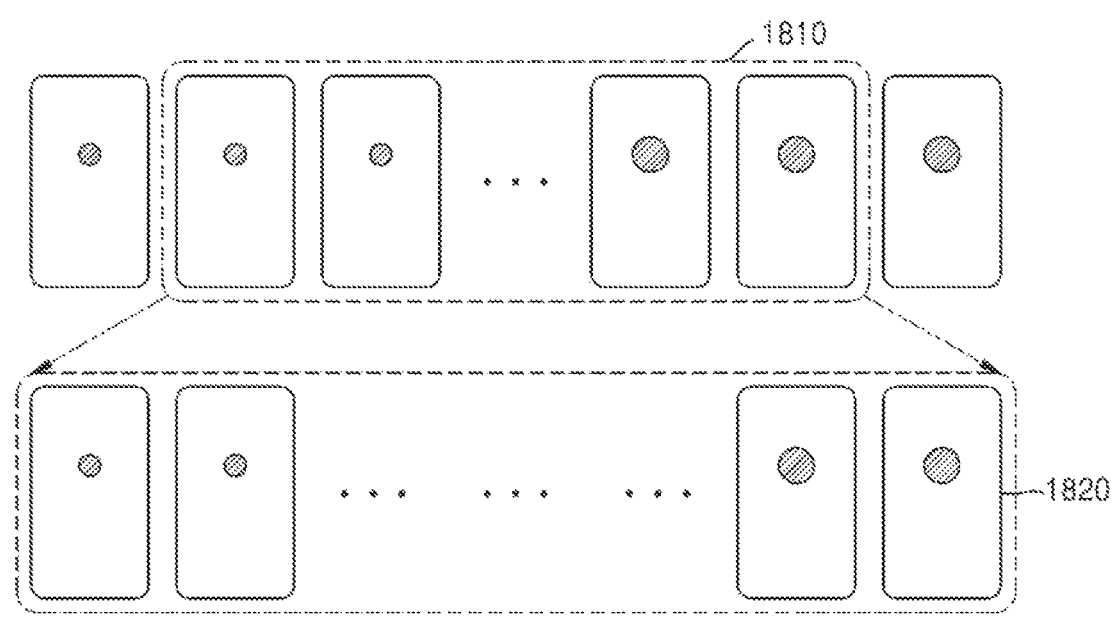
FIG. 18 is a diagram further describing FIG. 17, and is a diagram describing an example method of augmenting, by an electronic device, touch data and evaluating reliability of the touch data, according to an embodiment of the disclosure.

FIG. 18 is a diagram further describing FIG. 17, and is a diagram describing an example method of augmenting, by the electronic device 2000, touch data and evaluating reliability of the touch data, according to an embodiment of the disclosure.

In an embodiment of the disclosure, touch data obtained by the electronic device 2000 may consist of a plurality of image frames obtained in a time in which a touch input of a user is maintained.

In an embodiment of the disclosure, a level of a change in a touch area in a time band where the touch input is started and a level of a change in a touch area in a time band where the touch input is ended may not be great. For example, the electronic device 2000 may exclude a preset number of image frames corresponding to the touch start time band and a preset number of image frames corresponding to the touch end time band, and may evaluate reliability of training touch data using image frames 1810 corresponding to other time band.

The electronic device 2000 may perform frame interpolation on the image frames 1810 corresponding to other time band, and thus, may obtain a plurality of items of interpolated touch data 1820. The electronic device 2000 may apply the plurality of items of interpolated touch data 1820 to a touch recognition model, and thus, may output a touch type probability value.

The electronic device 2000 may identify a touch type corresponding to the interpolated touch data 1820, based on the touch type probability value output from the interpolated touch data 1820. For example, the electronic device 2000 may identify the touch type of the interpolated touch data 1820, based on a preset threshold value and a touch type probability of the interpolated touch data 1820. The electronic device 2000 may compare the identified touch type of the interpolated touch data 1820 with a touch type of the training touch data 1700, and may determine whether the touch type of the interpolated touch data 1820 is equal to the touch type of the training touch data 1700. When it is determined that the touch type of the interpolated touch data 1820 is equal to the touch type of the training touch data 1700, the electronic device 2000 may determine a label value labeled to the training touch data 1700 to be reliable. Therefore, the electronic device 2000 may finalize the label value of the training touch data 1700, and thus, may determine a final label value of the training touch data 1700.

FIG. 19 is a diagram of method of evaluating, by the electronic device 2000, reliability of labeled training touch data according to an embodiment of the disclosure.

The electronic device 2000, according to an embodiment of the disclosure, identifies training touch data having high reliability by evaluating reliability of training touch data, and updates a touch recognition model using the identified training touch data having high reliability.

The electronic device 2000, according to an embodiment of the disclosure, obtains a training touch dataset 1900. For example, a plurality of items of touch data included in the training touch dataset 1900 may be touch data in which a label value is labeled to real-use touch data obtained when a user actually uses the electronic device 2000 according to the aforementioned embodiments of the disclosure.

In an embodiment of the disclosure, the electronic device 2000 divides the plurality of items of touch data included in the training touch dataset 1900 into a plurality of subsets. For example, the electronic device 2000 may divide the training touch dataset 1900 into a subset 1 1902, a subset 2 1904, a subset 3 1906, . . . , and a subset N. For example, each of the subsets may include a plurality of items of touch data, and the plurality of items of touch data included in each of the subsets may be labeled with a label value that is at least one value from among a first type (force touch) and a second type (long touch).

In operation S1910, the electronic device 2000, according to an embodiment of the disclosure, selects the subset N that is an $n^{th}$ subset. In some embodiments, N may be an integer equal to or greater than 1. For example, the electronic device 2000 may select the subset 1 1902 in order to evaluate reliability of the subset 1 1902.

In operation S1920, the electronic device 2000, according to an embodiment of the disclosure, generates another touch recognition model, based on a plurality of items of touch data included in the subset N. For example, the other touch recognition model indicates a touch recognition model different from touch recognition models pre-stored in the electronic device 2000. For example, the electronic device 2000 may perform training using a plurality of items of touch data included in the subset 1 1902 as training data, and thus, may generate a touch recognition model corresponding to the subset 1 1902. The electronic device 2000 may evaluate reliability of the plurality of items of touch data included in the subset 1 1902, using the touch recognition model corresponding to the subset 1 1902 which is newly-generated another touch recognition model.

In operation S1930, the electronic device 2000, according to an embodiment of the disclosure, performs accuracy evaluation on a touch recognition model corresponding to the subset N. For example, the electronic device 2000 may use a sample touch dataset 1908 obtained by the electronic device 2000. In this case, a plurality of items of sample touch data included in the sample touch dataset 1908 may be touch data in which a true label value is labeled, the true label value being obtained by guiding, by the electronic device 2000 according to the aforementioned embodiment of the disclosure, a user with a sample touch input. The electronic device 2000 may verify the touch recognition model corresponding to the subset N, using the sample touch dataset 1908.

For example, when the touch recognition model corresponding to the subset 1 1902 is generated based on the subset 1 1902, the electronic device 2000 may obtain a touch type probability value by applying a plurality of items of touch data included in the sample touch dataset 1908 to the touch recognition model corresponding to the subset 1 1902. In this case, as a plurality of items of sample touch data included in the sample touch dataset 1908 are a plurality of items of touch data to which a true label value is labeled, the electronic device 2000 may calculate touch recognition accuracy of the touch recognition model corresponding to the subset 1 1902, based on an obtained touch type probability.

In operation S1940, the electronic device 2000, according to an embodiment of the disclosure, compares accuracy of the touch recognition model corresponding to the subset N with a threshold value. When the accuracy of the touch recognition model corresponding to the subset N is equal to or greater than the threshold value, the electronic device 2000 may perform operation S1950. Also, in this case, the electronic device 2000 may perform operation S1910 on a subset N+1. When the accuracy of the touch recognition model corresponding to the subset N is less than the threshold value, the electronic device 2000 may perform operation S1910 on the subset N+1.

In operation S1950, the electronic device 2000, according to an embodiment of the disclosure, configures the subset N as a training touch dataset.

For example, when it is identified that accuracy of the touch recognition model corresponding to the subset 1 1902 is equal to or greater than the threshold value in operation S1940, the electronic device 2000 may determine that reliability of the plurality of items of touch data included in the subset 1 1902 is high. In this case, the electronic device 2000 may identify the plurality of items of touch data included in the subset 1 1902 as training touch data, and thus, may configure a training touch dataset.

The electronic device 2000, according to an embodiment of the disclosure, may evaluate reliability of each of subsets by performing operations S1910 to S1950 on the subsets obtained by dividing the plurality of items of touch data included in the training touch dataset 1900, and may configure a plurality of items of touch data having high reliability as a training touch dataset.

In operation S1960, the electronic device 2000, according to an embodiment of the disclosure, re-trains an existing touch recognition model stored in the electronic device 2000, based on the training touch dataset newly configured by operations S1910 to S1950.

Figure 20A:
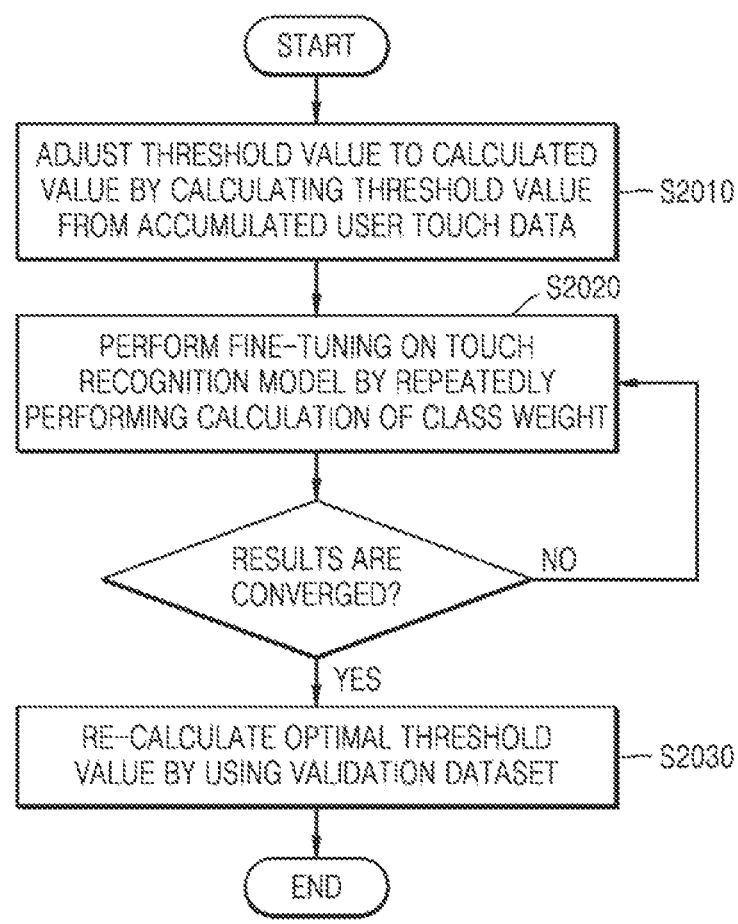
FIG. 20A is a flowchart of a method of updating a threshold value for identifying a touch type of a touch recognition model by an electronic device, according to an embodiment of the disclosure.

FIG. 20A is a flowchart of a method of updating a threshold value for identifying a touch type of a touch recognition model by the electronic device 2000, according to an embodiment of the disclosure.

In operation S2010, the electronic device 2000, according to an embodiment of the disclosure, obtains touch type probability values by applying accumulated user touch data to a touch recognition model. Also, the electronic device 2000 may update a threshold value for identifying a touch type to a modified threshold value 2019, based on the obtained probability values.

Figure 20B:
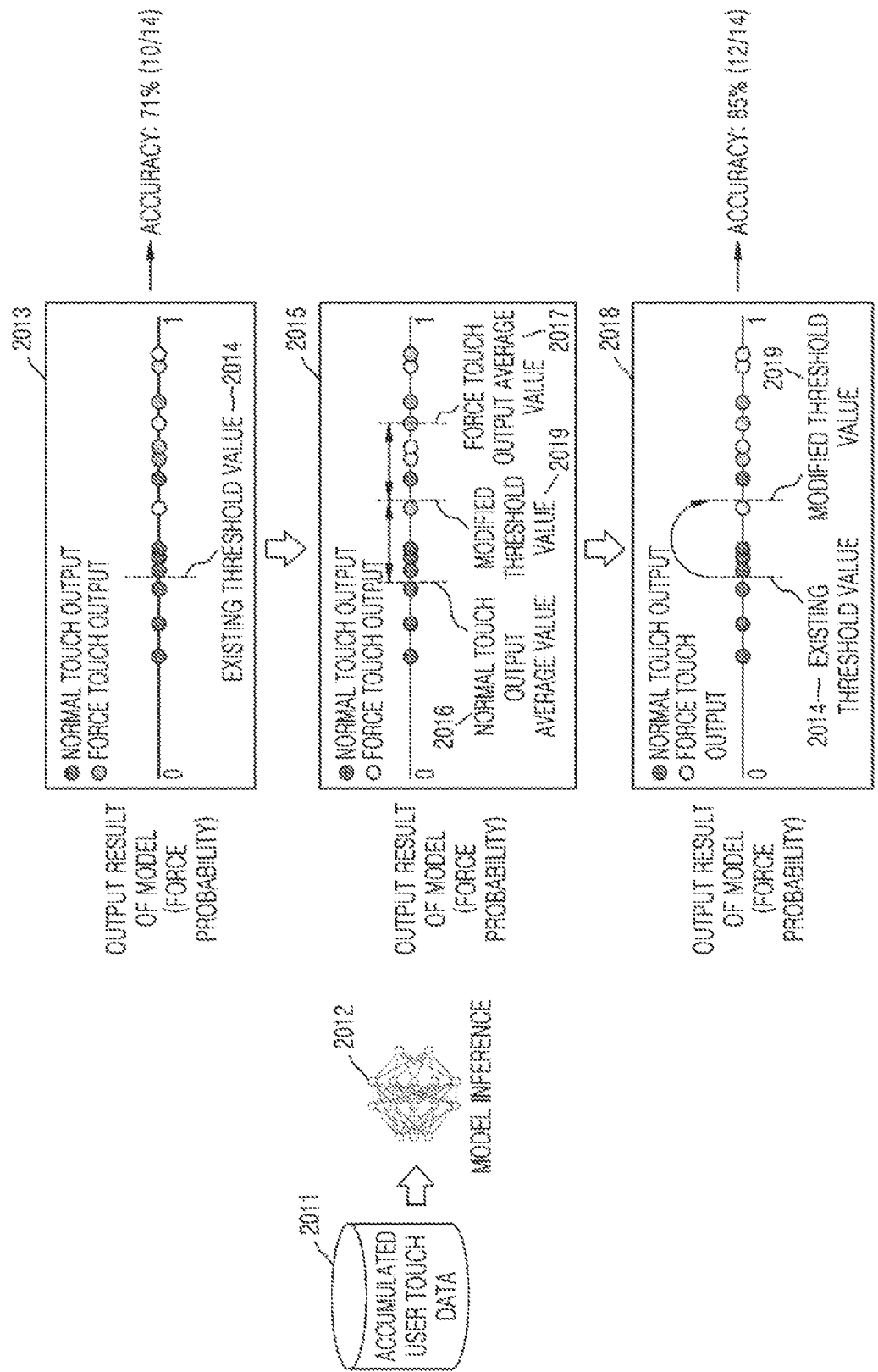
FIG. 20B is a diagram describing a method of updating, by an electronic device, a threshold value for identifying a touch type of a touch recognition model, according to an embodiment of the disclosure, and further describing operation S2010 of FIG. 20A.

Detailed operations of operation S2010 may be further described in reference to FIG. 20B.

In operation S2020, the electronic device 2000, according to an embodiment of the disclosure, performs fine-tuning on a touch recognition model 2012 while repeatedly performing calculation of a class weight. For example, the fine-tuning of the touch recognition model 2012 may indicate a task in which the touch recognition model 2012 improves accuracy of touch type identification by the touch recognition model 2012 by adjusting a threshold value for identifying a touch type.

The electronic device 2000, according to an embodiment of the disclosure, may divide accumulated user touch data into a validation dataset/training dataset.

The electronic device 2000 may calculate the class weight using the validation dataset/training dataset. Also, the electronic device 2000 may perform fine-tuning on a touch recognition model by re-training the touch recognition model, based on the calculated class weight. Until training results are converged, the electronic device 2000 may repeat a process of calculating the class weight, and performing fine-tuning on the touch recognition model.

In operation S2030, the electronic device 2000 recalculates an optimal threshold value 2025 using the validation dataset/training dataset. A method by which the electronic device 2000 calculates an optimal threshold value corresponds to a method of calculating the modified threshold value 2019 described in operation S2010, and thus, same descriptions are not provided here.

Figure 20C:
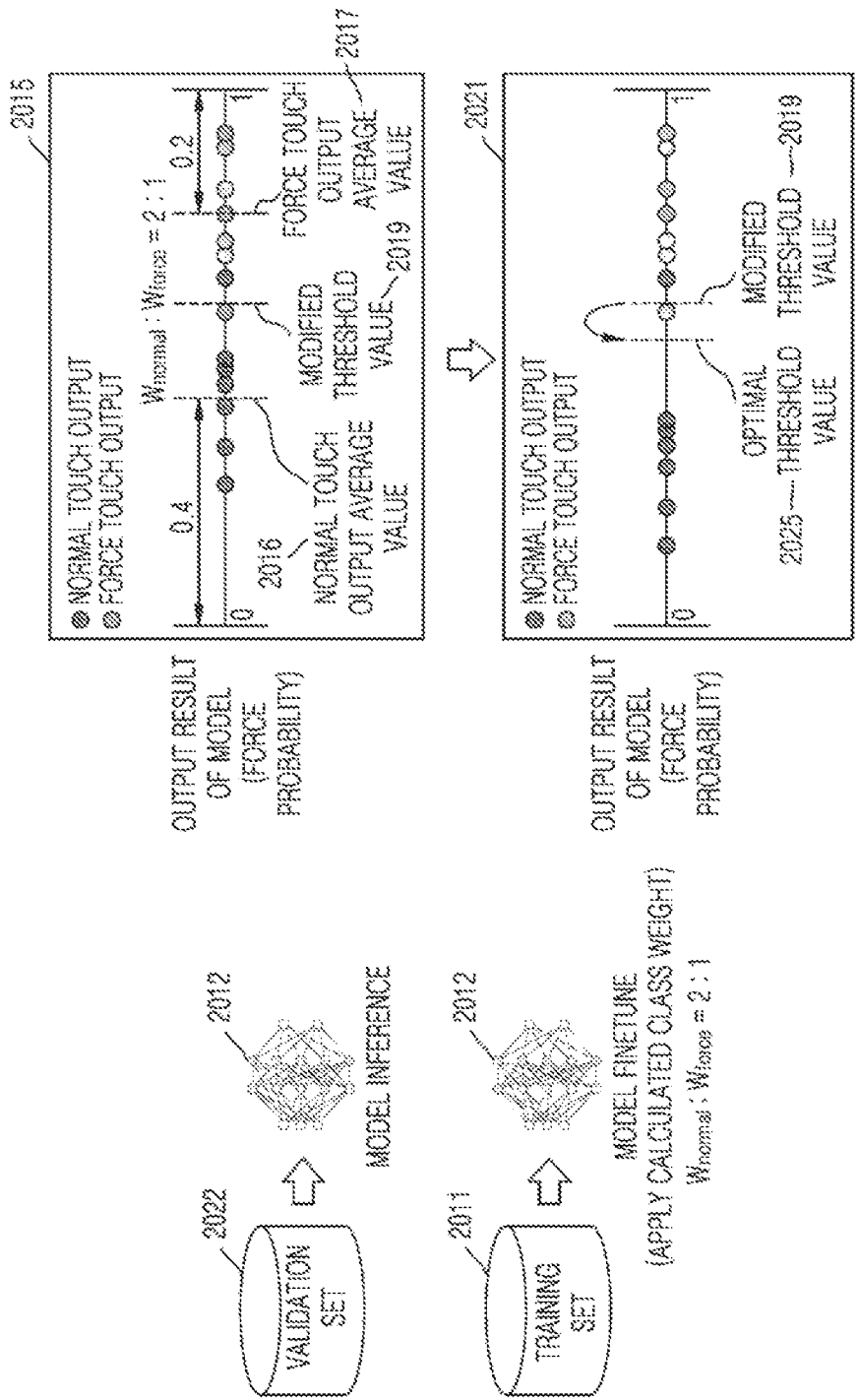
FIG. 20C is a diagram describing a method of updating, by an electronic device, a threshold value for identifying a touch type of a touch recognition model, according to an embodiment of the disclosure, and further describing operations S2020 and S2030 of FIG. 20A.

Detailed operations of operations S2020 and S2030 will be further described in reference to FIG. 20C.

FIG. 20B is a diagram describing a method of updating, by the electronic device 2000, a threshold value for identifying a touch type of a touch recognition model, according to an embodiment of the disclosure, and further describing operation of step S2010 of FIG. 20A.

The electronic device 2000, according to an embodiment of the disclosure, updates a threshold value for identifying a touch type of the touch recognition model 2012 using accumulated user touch data 2011. For example, the accumulated user touch data 2011 may include sample touch data and real-use touch data which are obtained from a user. Also, in the accumulated user touch data 2011, a label value of a touch type may have been labeled to a plurality of items of touch data according to the aforementioned embodiments of the disclosure.

A method by which the electronic device 2000 obtains sample touch data and real-use touch data from a user is described in the aforementioned embodiments of the disclosure, and thus, same descriptions are not provided here.

Hereinafter, for convenience of descriptions, it is assumed in an example that 7 items of force touch data being a first type touch and 7 items of normal touch data being a second type touch are included in the accumulated user touch data 2011. Here, one item of touch data does not indicate one image frame corresponding to touch data but indicates one set of image frames obtained while a touch input of a user is maintained.

In an embodiment of the disclosure, a touch type probability value output from the touch recognition model 2012 may be a value between 0 and 1. The electronic device 2000 may identify a touch type by comparing the output probability value with a threshold value for identifying the touch type.

Reference numerals 2013, 2015, and 2018 of FIG. 20B refer to blocks indicating touch type probability values output by applying the accumulated user touch data 2011 to the touch recognition model 2012. Referring to the block 2013, an existing threshold value 2014 of the touch recognition model 2012 used to identify a touch type may be 0.45, for example. That is, when a touch type probability value output from the touch recognition model 2012 is equal to or greater than the existing threshold value 2014 (e.g., 0.45), the electronic device 2000 may identify touch data as a force touch, and when the output touch type probability value is smaller than the existing threshold value 2014 (e.g., 0.45), the electronic device 2000 may identify the touch data as a normal touch. Therefore, although 7 items of force touch data and 7 items of normal touch data are actually input to the touch recognition model 2012, when a touch type is identified based on the existing threshold value 2014, 11 items of touch data whose touch type probability values are equal to or greater than the existing threshold value 2014 may be identified as a force touch, and 3 items of touch data whose touch type probability values are smaller than the existing threshold value 2014 may be identified as a normal touch. That is, 4 items from among 7 items of normal touch data are mistakenly identified as a force touch, and thus, accuracy of a result of identifying 14 items of touch data (7 items of force touch data and 7 items of normal touch data) may be 71%. (10 items of touch data from among 14 items of touch data are correctly identified)

The electronic device 2000 updates an existing threshold value, based on an output result from the touch recognition model 2012 which is obtained using the accumulated user touch data 2011. In an embodiment of the disclosure, the electronic device 2000 calculates an average of touch type probability values with respect to respective touch types, based on the output result from the touch recognition model 2012.

For example, referring to the block 2015, the electronic device 2000 may calculate a normal touch output average value 2016 that is an average of touch type probability values obtained by inputting a plurality of items of normal touch data to the touch recognition model 2012. Also, the electronic device 2000 may calculate a force touch output average value 2017 that is an average of touch type probability values obtained by inputting a plurality of items of force touch data to the touch recognition model 2012. The electronic device 2000 may calculate the modified threshold value 2019, based on the normal touch output average value 2016 and the force touch output average value 2017.

The electronic device 2000 may calculate a modified threshold value using Equation 2 below.

$$Th_{new} = \left\{ \frac{\sum_{i=1}^{n_{normal}} p_{normal}}{n_{normal}} + \frac{\sum_{i=1}^{n_{force}} p_{force}}{n_{force}} \right\} \times 0.5 \qquad [\text{Eq. 2}]$$

where, $Th_{new}$ may indicate a modified threshold value, $n_{normal}$ may indicate the number of a plurality of items of normal touch data, $n_{force}$ may indicate the number of a plurality of items of force touch data, $p_{normal}$ may indicate an output of a touch recognition model (a touch type probability value) with respect to normal touch data, and $p_{force}$ may indicate an output of a touch recognition model (a touch type probability value) with respect to force touch data. That is, the modified threshold value may be obtained by summing an average of output values of the touch recognition model with respect to normal touch data and an average of output values of the touch recognition model with respect to force touch data and then dividing the sum thereof in half.

The electronic device 2000 may update a threshold value for identifying a touch type of the touch recognition model 2012 from the existing threshold value 2014 to the modified threshold value 2019. Referring to the block 2018, when a touch input is identified based on the modified threshold value 2019, 7 items of touch data whose touch type probability values are equal to or greater than the modified threshold value 2019 may be identified as a force touch, and 7 items of touch data whose touch type probability values are smaller than the modified threshold value 2019 may be identified as a normal touch. That is, 1 item from among 7 items of normal touch data is mistakenly identified as a force touch, 1 item from among 7 items of force touch data is mistakenly identified as a normal touch, and thus, accuracy of a result of identifying 14 items of touch data (7 items of force touch data and 7 items of normal touch data) may be 85%. (12 items of touch data from among 14 items of touch data are correctly identified)

That is, the electronic device 2000 improves accuracy of touch type identification by updating a threshold value for identifying a touch type from the existing threshold value 2014 to the modified threshold value 2019.

FIG. 20C is a diagram describing a method of updating, by the electronic device 2000, a threshold value for identifying a touch type of a touch recognition model, according to an embodiment of the disclosure, and further describing operations S2020 and S2030 of FIG. 20A.

First, a detailed process of operation S2020 will now be described, and then a detailed process of operation S2030 will be described.

In operation S2020, the electronic device 2000, according to an embodiment of the disclosure, performs fine-tuning on the touch recognition model 2012 while repeatedly performing calculation of a class weight.

The electronic device 2000, according to an embodiment of the disclosure, divides the accumulated user touch data 2011 into a validation dataset/training dataset.

The electronic device 2000 calculates the class weight using the validation dataset/training dataset. For example, a class may indicate a category of a divided touch type, and may correspond to a label value according to the aforementioned embodiments of the disclosure. That is, a plurality of items of touch data included in a normal touch class may have been labeled with a label value corresponding to 'normal touch', and a plurality of items of touch data included in a force touch class may have been labeled with a label value corresponding to 'force touch'. Also, the class weight indicates a weight to be applied to a loss function of each class when the touch recognition model 2012 is trained.

The electronic device 2000 performs fine-tuning on the touch recognition model 2012 by re-training the touch recognition model 2012, based on the calculated class weight. Until training results are converged, the electronic device 2000 repeats a process of calculating the class weight, and performing fine-tuning on the touch recognition model 2012.

In an embodiment of the disclosure, the electronic device 2000 applies a plurality of items of touch data included in the validation dataset/training dataset to the touch recognition model 2012, and obtains touch type probability values.

For convenience of descriptions, it is assumed in an example that 14 items of touch data in the example of FIG. 20B are the validation dataset/training dataset. That is, 7 items of force touch data and 7 items of normal touch data are in the example. For example, touch data included in the validation dataset/training dataset may consist of all or some of a plurality of items of touch data excluding a plurality of items of touch data included in the validation dataset/training dataset from among the accumulated user touch data 2011.

Referring back to the block 2015, the electronic device 2000 calculates the normal touch output average value 2016 that is an average of touch type probability values obtained by inputting a plurality of items of normal touch data to the touch recognition model 2012. Also, the electronic device 2000 may calculate the force touch output average value 2017 that is an average of touch type probability values obtained by inputting a plurality of items of force touch data to the touch recognition model 2012. The electronic device 2000 may calculate a class weight, based on the normal touch output average value 2016 and the force touch output average value 2017.

The electronic device 2000 may calculate a class weight using Equation 3 below.

$$W_{normal}:W_{force} = \frac{\sum_{i=1}^{n_{normal}} p_{normal}}{n_{normal}} : 1 - \frac{\sum_{i=1}^{n_{force}} p_{force}}{n_{force}} \qquad [\text{Eq. 3}]$$

where, $W_{normal}$ normal may indicate a class weight of a normal touch class, $W_{force}$ may indicate a class weight of a force touch class, $n_{normal}$ may indicate the number of a plurality of items of normal touch data, $n_{force}$ may indicate the number of a plurality of items of force touch data, $p_{normal}$ may indicate an output of a touch recognition model (a touch type probability value) with respect to normal touch data, and $p_{force}$ may indicate an output of a touch recognition model (a touch type probability value) with respect to force touch data. That is, $W_{normal}:W_{force}$ may be determined based on a ratio of 'normal touch output average value $$\left( \frac{\sum_{i=1}^{n_{normal}} p_{normal}}{n_{normal}} \right),$$

and '1-force touch output average value $$\left( 1 - \frac{\sum_{i=1}^{n_{force}} p_{force}}{n_{force}} \right).$$

For example, when two values are smaller than a preset value (e.g., 0.1), the electronic device 2000 may determine $W_{normal}:W_{force}=1:1$.

Referring back to the block 2015, when the normal touch output average value is '0.4', and the force touch output average value is '0.8', the electronic device 2000 may determine $W_{normal}:W_{force}=2:1$.

The electronic device 2000 may perform fine-tuning on the touch recognition model 2012 by re-training the touch recognition model 2012 by applying the calculated class weight and using the validation dataset/training dataset.

For example, the electronic device 2000 may configure a class weight of a normal touch class to be higher than a class weight of a force touch class, such that a normal touch output average value that is an average of outputs of a touch recognition model (a touch type probability value) with respect to normal touch data may become closer to 0.

In an embodiment of the disclosure, until training results are converged, the electronic device 2000 may repeat a process of calculating the class weight, and performing fine-tuning on the touch recognition model 2012.

In operation S2030, the electronic device 2000 calculates the optimal threshold value 2025 using the validation dataset/training dataset. A method by which the electronic device 2000 calculates an optimal threshold value corresponds to a method of calculating the modified threshold value 2019 described in operation S2010, and thus, same descriptions are not provided here.

The electronic device 2000, according to an embodiment of the disclosure, may improve accuracy of touch type identification by updating a threshold value for identifying a touch type from the modified threshold value 2019 to the optimal threshold value 2025.

FIG. 21 is a diagram describing a method of obtaining, by the electronic device 2000 from touch data, touch occurrence area data indicating an area where a touch input occurs, according to an embodiment of the disclosure.

In an embodiment of the disclosure, the electronic device 2000 obtains touch occurrence area data indicating an area where a touch input occurs, using touch data obtained from a user.

According to the aforementioned embodiments of the disclosure, the electronic device 2000 may obtain, at preset time intervals, touch data about an area in which a touch input of a user is received via a touchscreen. For example, the electronic device 2000 may obtain, at preset time intervals, an image frame of a preset size (M×N) including the area in which the touch input of the user is received.

For convenience of description, hereinafter, it is assumed in an example that the electronic device 2000 obtains an image frame of a P×P size at 1/T Hz, that is, the electronic device 2000 obtains K image frames by obtaining an image frame of a P×P size at T(ms) time intervals.

In an embodiment of the disclosure, the electronic device 2000 may calculate an average touch image frame from image frames included in touch data 2110. For example, the electronic device 2000 may calculate an average touch image frame by averaging the touch data 2110 in a time-axis direction, the touch data 2110 being obtained as K image frames according to a time sequence.

The electronic device 2000, according to an embodiment of the disclosure, obtains touch occurrence area data indicating an area where a touch input of a user occurs, based on the calculated average touch image frame.

In an embodiment of the disclosure, the electronic device 2000 may obtain touch occurrence area data 2120 by masking, with respect to pixels in an average touch image frame, a pixel having a pixel value equal to or greater than a threshold value as 1 and a pixel having a pixel value smaller than the threshold value as 0.

In an embodiment of the disclosure, the electronic device 2000 may obtain touch occurrence area data 2130 having an ellipsoid shape, by applying an ellipsoid fitting algorithm to an average touch image frame.

The obtained touch occurrence area data 2120 or 2130 may be used as training data when the electronic device 2000 trains a touch recognition model or may be used as input data when the electronic device 2000 infers a touch type using the touch recognition model.

Figure 22:
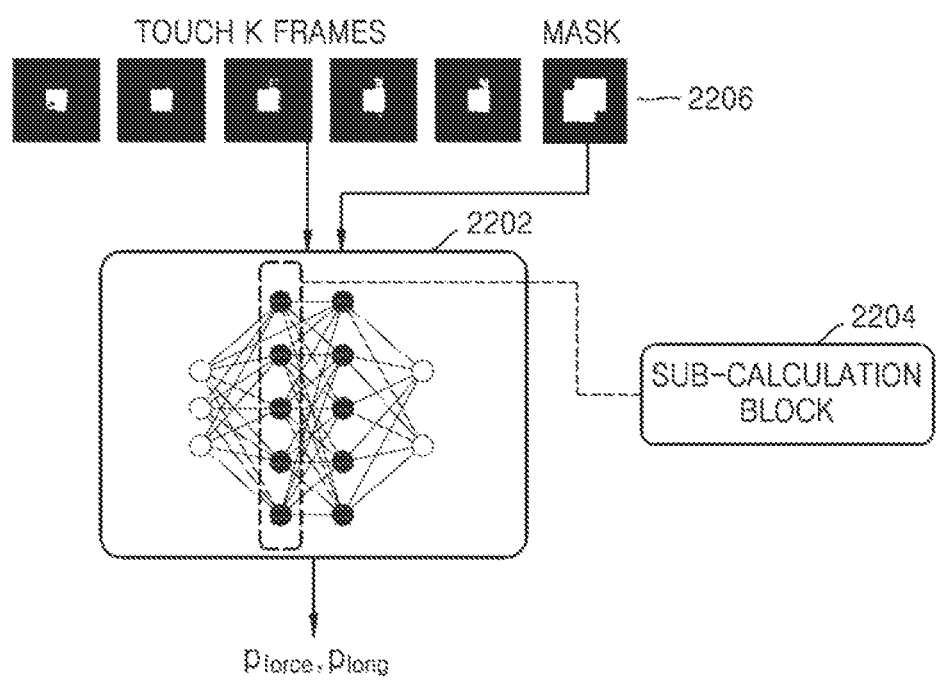
FIG. 22 is a diagram describing a method of using touch occurrence area data by an electronic device, according to an embodiment of the disclosure.

FIG. 22 is a diagram describing a method of using touch occurrence area data by the electronic device 2000, according to an embodiment of the disclosure.

When the electronic device 2000 according to an embodiment of the disclosure trains touch recognition models, the electronic device 2000 trains the touch recognition models by using touch occurrence area data. Also, when the electronic device 2000 identifies a touch type of a touch input of a user using the touch recognition models, the electronic device 2000 infers the touch type using the touch occurrence area data.

A method by which the electronic device 2000 generates touch occurrence area data is described in reference to FIG. 21, and thus, same descriptions are not provided here.

In an embodiment of the disclosure, a touch recognition model 2202 used by the electronic device 2000 may be implemented as a Residual Network with Attention (ResNet) model. However, a network structure of the touch recognition model 2202 is not limited thereto.

In an embodiment of the disclosure, the touch recognition model 2202 may include a plurality of neural network layers. Also, the touch recognition model 2202 may include at least one sub-calculation block 2204 including one or more neural network layers. For example, at least some of neural network layers included in the touch recognition model 2202 may be neural network layers configured to receive input data from a previous layer and thus output a feature map.

In an embodiment of the disclosure, touch occurrence area data 2206 may be used when touch data is input to the touch recognition model 2202.

When touch data (e.g., K image frames) is input to the touch recognition model 2202, the electronic device 2000 according to an embodiment of the disclosure may mask at least some of the touch data, based on the touch occurrence area data 2206.

In another embodiment of the disclosure, the touch occurrence area data 2206 may be used when a feature map is output from the sub-calculation block 2204 included in the touch recognition model 2202. When the feature map is output from the sub-calculation block 2204 included in the touch recognition model 2202, the electronic device 2000 may mask at least some of the feature map being output based on the touch occurrence area data 2206.

In another embodiment of the disclosure, the touch occurrence area data 2206 may be used when input data is input to a next neural network layer in the sub-calculation block 2204 included in the touch recognition model 2202. When data is input to a neural network layer in the sub-calculation block 2204, the electronic device 2000 may mask at least some of data being input to a next neural network layer, based on the touch occurrence area data 2206.

When the electronic device 2000, according to an embodiment of the disclosure, trains the touch recognition model 2202 or infers a touch type using the touch recognition model 2202, the electronic device 2000 may apply a weight to an area including significant data using the touch occurrence area data 2206, and thus, may improve accuracy of identifying, by the touch recognition model 2202, a touch type.

Figure 23:
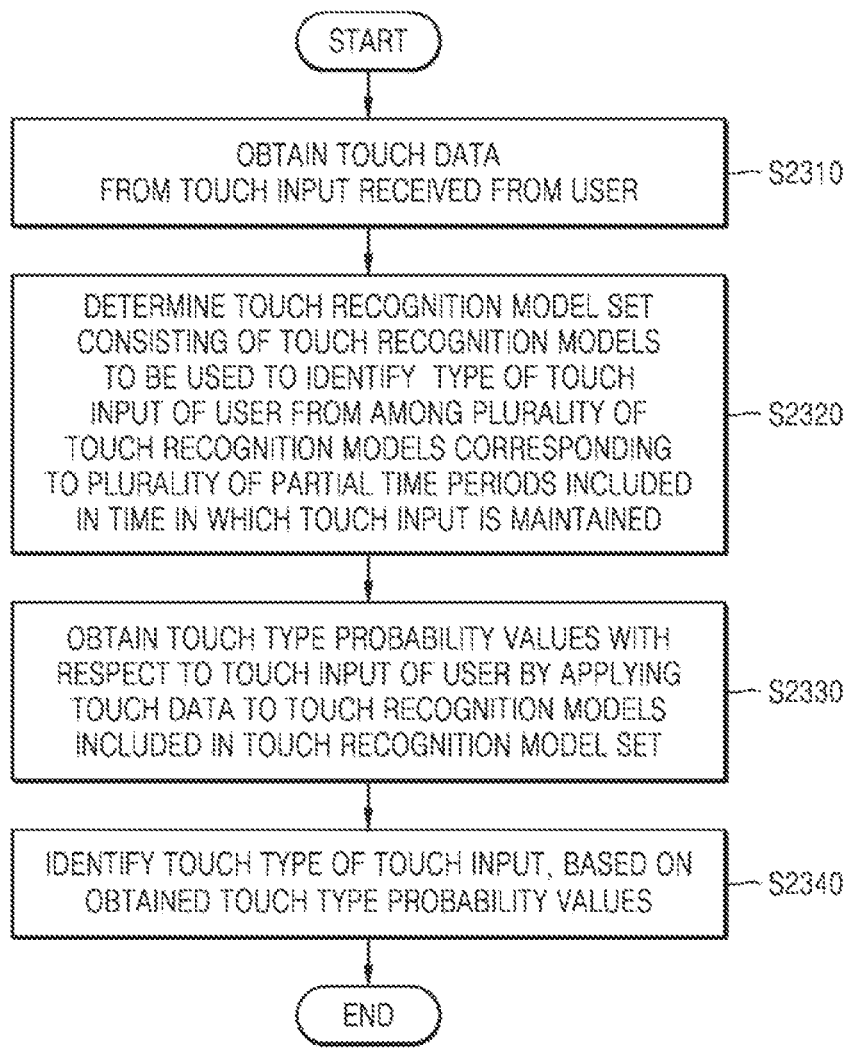
FIG. 23 is a flowchart of a method for identifying, by an electronic device, a touch type of a touch input of a user, according to an embodiment of the disclosure.

FIG. 23 is a flowchart of a method for identifying, by the electronic device 2000, a touch type of a touch input of a user, according to an embodiment of the disclosure.

In operation S2310, the electronic device 2000, according to an embodiment of the disclosure, obtains touch data from a touch input received from a user. A method by which the electronic device 2000 obtains touch data is described in reference to FIG. 5, and thus, same descriptions are not provided here.

In operation S2320, the electronic device 2000, according to an embodiment of the disclosure, determines a touch recognition model set consisting of touch recognition models used to identify a touch type of the touch input of the user from among a plurality of touch recognition models corresponding to a plurality of partial time periods included in a time in which the touch input is maintained. For example, the touch recognition model set may have been previously configured with respect to the user.

A method of configuring a touch recognition model set and a method of performing touch recognition based on the configured touch recognition model set, the methods being performed by the electronic device 2000, are described in reference to FIGS. 9 and 10, and thus, same descriptions are not provided here.

In operation S2330, the electronic device 2000, according to an embodiment of the disclosure, obtains touch type probability values with respect to the touch input of the user by applying the touch data to the touch recognition models included in the touch recognition model set.

In operation S2340, the electronic device 2000, according to an embodiment of the disclosure, identifies the touch type of the touch input, based on the obtained touch type probability values.

A method by which the electronic device 2000 obtains touch type probability values with respect to a touch input of a user and identifies a touch type of the touch input based on the obtained touch type probability values is described in reference to FIG. 11, and thus, same descriptions are not provided here.

Figure 24:
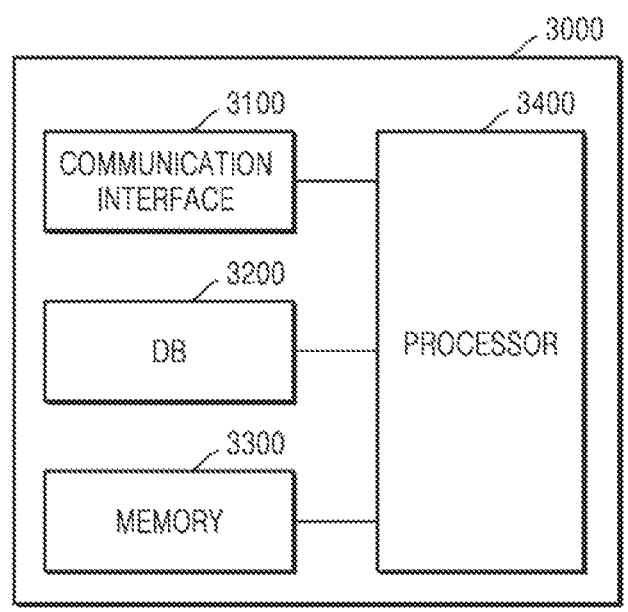
FIG. 24 is a block diagram illustrating a configuration of a server, according to an embodiment of the disclosure.

FIG. 24 is a block diagram illustrating a configuration of a server 3000, according to an embodiment of the disclosure.

The server 3000, according to an embodiment of the disclosure, may be communicatively coupled with the electronic device 2000 via a wired communication or wireless communication scheme and may perform data communication.

The server 3000, according to an embodiment of the disclosure, may include a communication interface 3100, a database (DB) 3200, a memory 3300, and a processor 3400.

The communication interface 3100, according to an embodiment of the disclosure, may include at least one component for enabling communication through a local area network (LAN), a wide area network (WAN), a value-added network (VAN), a mobile radio communication network, a satellite communication network, or a combination thereof.

The communication interface 3100, according to an embodiment of the disclosure, may transmit a base touch recognition model and a plurality of touch recognition models to the electronic device 2000. Also, the communication interface 3100 may receive, from the electronic device 2000, sample touch data and real-use touch data, and may transmit, to the electronic device 2000, an updated base touch recognition model and a plurality of updated touch recognition models. Also, the communication interface 3100 may receive, from the electronic device 2000, at least one of a base touch recognition model or a plurality of touch recognition models, and may transmit, to the electronic device 2000, an updated touch recognition model.

The DB 3200 may store data received from the electronic device 2000. The DB 3200 may store touch recognition models generated through training by the server 3000, and a plurality of training touch datasets used to train the touch recognition models.

The memory 3300 may store various data, a program, or an application to drive and control the server 3000. The program stored in the memory 3300 may include one or more instructions. The program (the one or more instructions) or the application stored in the memory 3300 may be executed by the processor 3400. The memory 3300 may have stored therein a module for performing a same function as a module stored in the electronic device 2000. For example, the memory 3300 may have stored therein data and program instruction codes corresponding to a touch type identification module (not shown), a touch recognition model configuration module (not shown), a training data collection module (not shown), and a touch recognition model management module (not shown).

The processor 3400 may overall control the server 3000. The processor 3400, according to an embodiment of the disclosure, may execute one or more programs stored in the memory 3300.

The processor 3400, according to an embodiment of the disclosure, may include an application processor (AP), a central processing unit (CPU), a graphics processing unit (GPU), a neural processing unit, a dedicated AI processor designed with a hardware structure specialized for processing an AI model, and the like.

The processor 3400 may perform operations being executable by the electronic device 2000 according to the aforementioned embodiments of the disclosure.

The processor 3400 may identify a touch type of a touch input of a user. The processor 3400 may receive touch data of the user from the electronic device 2000, and may identify the touch type of the touch input of the user using the base touch recognition model and the plurality of touch recognition models stored in the DB 3200. A method by which the server 3000 identifies a touch type of a touch input of a user corresponds to a method by which the electronic device 2000 identifies a touch type of a touch input of a user, and thus, same descriptions are not provided here.

The processor 3400 may configure a touch recognition model set consisting of touch recognition models used to identify a touch type of a touch input of a user. These features correspond to a method, performed by the electronic device 2000, of configuring a touch recognition model set, and thus, same descriptions are not provided here.

The processor 3400 may generate a base touch recognition model and a plurality of touch recognition models by performing training using stored data. The generated base touch recognition model and the plurality of generated touch recognition models may be transmitted to the electronic device 2000.

The processor 3400 may receive, from the electronic device 2000, training touch data obtained as a user actually uses the electronic device 2000, and may update the base touch recognition model and the plurality of touch recognition models. These features correspond to a method by which the electronic device 2000 updates touch recognition models, and thus, same descriptions are not provided here.

The block diagram of the electronic device 2000 illustrated in FIG. 2 and the block diagram of the server 3000 illustrated in FIG. 24 are block diagrams for an embodiment of the disclosure. Components in the block diagrams may be combined, a component may be added thereto, or at least one of the components may be omitted, according to actual specifications of an electronic device. That is, at least two components may be combined to one component, or one component may be divided into two components when necessary. Alternatively or additionally, functions performed in each block describe the embodiments of the disclosure, and detailed operations or devices do not limit the scope of the disclosure.

An operating method of an electronic device, according to an embodiment of the disclosure, may be embodied as program commands executable by various computer means and may be recorded on a computer-readable recording medium. The computer-readable recording medium may include program commands, data files, data structures, and the like separately or in combinations. The program commands recorded on the computer-readable recording medium may be specially designed and configured for the disclosure or may be well-known to and be usable by one of ordinary skill in the art of computer software. Examples of the computer-readable recording medium include a magnetic medium such as a hard disk, a floppy disk, or a magnetic tape, an optical medium such as a compact disc read-only memory (CD-ROM) or a digital versatile disc (DVD), a magneto-optical medium such as a floptical disk, and a hardware device specially configured to store and execute program commands such as a read-only memory (ROM), a random-access memory (RAM), or a flash memory. Examples of the program commands include high-level language codes that may be executed by a computer using an interpreter or the like as well as machine language codes made by a compiler.

Also, the operating method of the electronic device according to embodiments of the disclosure may be provided in a computer program product. The computer program product is a product purchasable between a seller and a purchaser.

The computer program product may include a software program and a computer-readable storage medium in which the software program is stored. For example, the computer program product may include a software program-type product (e.g., a downloadable application) electronically distributed through a manufacturer of an electronic device or an electronic market. For electronic distribution, at least a portion of the software program may be stored in a storage medium or temporarily generated. For example, the storage medium may be a server of the manufacturer, a server of the electronic market, or a storage medium of a relay server that temporarily stores the software program.

The computer program product may include a storage medium of a server or a storage medium of a client device in a system including the server and the client device. Alternatively, when there is a third device (e.g., a smartphone) communicating with the server or the client device, the computer program product may include a storage medium of the third device. Alternatively, the computer program product may include a software program itself transmitted from the server to the client device or the third device or from the third device to the client device.

For example, one of the server, the client device, and the third device may execute a method according to embodiments of the disclosure by executing the computer program product. Alternatively, at least two of the server, the client device, and the third device may execute a method according to embodiments of the disclosure in a distributed fashion by executing the computer program product.

For example, the server (e.g., a cloud server or an AI server) may execute the computer program product stored in the server, and may control the client device communicating with the server to perform a method according to embodiments of the disclosure.

Although the embodiments of the disclosure have been described in detail above, the scope of the disclosure is not limited thereto, and various modifications and improvements made by one of ordinary skill in the art using the basic concept of the disclosure defined by the claims are also within the scope of the disclosure.

What is claimed is:

1. A method of identifying a touch type of a touch input of a user with respect to an electronic device, the method comprising:
    obtaining touch data from the touch input of the user;
    selecting at least one touch recognition model from among a plurality of touch recognition models, the at least one touch recognition model corresponding to each partial time period of a plurality of partial time periods included in a time period during which the touch input is maintained, resulting in a touch recognition model set;
    wherein each of the touch recognition model set is trained to identify a touch type of the touch input from the touch data obtained during a corresponding partial time period of the plurality of partial time periods during which the touch input is maintained;
    applying the touch data to the touch recognition models included in the touch recognition model set to obtain touch type probability values of the touch input according to the plurality of partial time periods respectively corresponding to the touch recognition model set; and
    identifying the touch type of the touch input by combining the obtained touch type probability values to which weights have been applied, each of the weights corresponding to a partial time period of the plurality of partial time periods.

2. The method of claim 1, further comprising:
    obtaining sample touch data corresponding to a first type touch and a second type touch, by guiding the user to provide a sample touch input corresponding to the first type touch and the second type touch; and configuring, with respect to the user, the plurality of touch recognition models based on the sample touch data,
    wherein the determining the touch recognition model set comprises determining the touch recognition model set, based on the configured plurality of touch recognition models.

3. The method of claim 2, wherein the determining the touch recognition model set comprises:
    applying the sample touch data to the plurality of touch recognition models;
    obtaining, from the plurality of touch recognition models, sample touch type probability values indicating results of inferences with respect to a touch type of the sample touch input;
    determining accuracy of the inferences with respect to the touch type of the sample touch input, the inferences being respectively performed by the plurality of touch recognition models, based on the sample touch type probability values, and a corresponding touch type that the electronic device guided to the user; and
    configuring, based on the accuracy of the inferences, the touch recognition model set.

4. The method of claim 2, wherein the first type touch is a force touch identified based on a strength of a touch force applied to the electronic device, and the second type touch is a long touch identified based on a touch time applied to the electronic device.

5. The method of claim 2, further comprising:
obtaining other touch data from different touch inputs being input by the user using the electronic device.

6. The method of claim 5, further comprising:
labeling, with respect to the other touch data, a label value indicating the touch type;
obtaining, according to the labeling, training data to train the touch recognition models comprised in the touch recognition model set; and
updating the touch recognition models included in the touch recognition model set using the training data.

7. The method of claim 6, further comprising:
obtaining, from the other touch data, touch occurrence area data indicating an area where the touch input of the user occurs,
wherein the updating the touch recognition models included in the touch recognition model set using the training data comprises updating the touch recognition models included in the touch recognition model set using the training data and the touch occurrence area data.

8. The method of claim 5, further comprising:
updating a touch type identification threshold value for each of the touch recognition models included in the touch recognition model set, based on the sample touch data and the other touch data.

9. The method of claim 1, further comprising:
applying the touch data to a base touch recognition model; and
determining whether to identify the touch type of the touch input of the user using the touch recognition models included in the touch recognition model set,
wherein the base touch recognition model is trained to identify a touch type of a touch input of the user, based on touch data corresponding to the time period during which the touch input of the user is maintained.

10. The method of claim 1, further comprising:
obtaining, from the plurality of touch recognition models, touch type probability values of time periods respectively corresponding to the plurality of touch recognition models;
generating pattern information of the user applying a force to the electronic device, based on the touch type probability values obtained from the plurality of touch recognition models; and
determining a primary time period, based on the pattern information,
wherein the identifying the touch type of the touch input comprises combining touch type probability values obtained from the touch recognition models included in the touch recognition model set by applying a weight to the primary time period.

11. An electronic device for identifying a touch type of a touch input of a user, the electronic device comprising:
a user interface configured to obtain touch data from the touch input of the user;
a memory storing one or more instructions; and
at least one processor configured to execute the one or more instructions stored in the memory to:
select at least one touch recognition model from among a plurality of touch recognition models, the at least one touch recognition model corresponding to each partial time period of a plurality of partial time periods included in a time period during which the touch input is maintained, resulting in a touch recognition model set,
wherein each of the touch recognition model set is trained to identify a touch type of the touch input from the touch data, obtained during a corresponding partial time period of the plurality of partial time periods during which the touch input is maintained,
apply the touch data to the touch recognition models comprised in the touch recognition model set to obtain touch type probability values of the touch input according to the plurality of partial time periods respectively corresponding to the touch recognition model set, and
identify a touch type of the touch input by combining the obtained touch type probability values to which weights have been applied, each of the weights corresponding to a partial time period of the plurality of partial time periods.

12. The electronic device of claim 11, wherein the at least one processor is further configured to execute the one or more instructions to:
obtain sample touch data corresponding to a first type touch and a second type touch, by guiding the user to provide a sample touch input corresponding to the first type touch and the second type touch,
configure, with respect to the user, the plurality of touch recognition models based on the obtained sample touch data, and
determine the touch recognition model set, based on the configured plurality of touch recognition models.

13. The electronic device of claim 12, wherein the at least one processor is further configured to execute the one or more instructions to:
apply the sample touch data to the plurality of touch recognition models;
obtain, from the plurality of touch recognition models, sample touch type probability values indicating results of inferences with respect to a touch type of the sample touch input;
determine accuracy of the inferences with respect to the touch type of the sample touch input, the inferences being respectively performed by the plurality of touch recognition models, based on the sample touch type probability values, and a corresponding touch type that the electronic device guided to the user, and
configure, based on the accuracy of the inferences, the touch recognition model set.

14. The electronic device of claim 12, wherein the at least one processor is further configured to execute the one or more instructions to obtain other touch data from different touch inputs being input by the user using the electronic device.

15. The electronic device of claim 14, wherein the at least one processor is further configured to execute the one or more instructions to:
label, with respect to the other touch data, a label value indicating the touch type;
obtain, according to the labeling, training data to train the touch recognition models comprised in the touch recognition model set, and
update the touch recognition models comprised in the touch recognition model set using the training data.

16. The electronic device of claim 15, wherein the at least one processor is further configured to execute the one or more instructions to:

obtain, from the other touch data, touch occurrence area data indicating an area where the touch input of the user occurs; and update the touch recognition models comprised in the touch recognition model set using the training data and the touch occurrence area data.

17. The electronic device of claim 14, wherein the at least one processor is further configured to execute the one or more instructions to update a touch type identification threshold value for each touch recognition model of the touch recognition model set, based on the sample touch data and the other touch data.

18. The electronic device of claim 11, wherein the at least one processor is further configured to execute the one or more instructions to:

apply the touch data to a base touch recognition model; and determine whether to identify the touch type of the touch input of the user using the touch recognition models included in the touch recognition model set, and wherein the base touch recognition model is trained to identify a touch type of a touch input of the user, based on touch data corresponding to the time period during which the touch input of the user is maintained.

19. The electronic device of claim 11, wherein the at least one processor is further configured to execute the one or more instructions to:

obtain, from the plurality of touch recognition models, touch type probability values of time periods respectively corresponding to the plurality of touch recognition models, generate pattern information of the user applying a force to the electronic device, based on the touch type probability values obtained from the plurality of touch recognition models, determine a primary time period, based on the pattern information, and combine touch type probability values obtained from the touch recognition models included in the touch recognition model set by applying a weight to the primary time period.

20. A non-transitory computer-readable recording medium having recorded thereon a program that is executable by a computer to perform the method of claim 1.

* * * * *